(12) United States Patent
Collins

(10) Patent No.: US 7,472,254 B2
(45) Date of Patent: Dec. 30, 2008

(54) SYSTEMS AND METHODS FOR MODIFYING A SET OF DATA OBJECTS

(75) Inventor: Brian Collins, New Malden (GB)

(73) Assignee: IOra, Ltd., Hampshire (GB)

( * ) Notice: Subject to any disclaimer, the term of this patent is extended or adjusted under 35 U.S.C. 154(b) by 399 days.

(21) Appl. No.: 10/960,133

(22) Filed: Oct. 7, 2004

(65) Prior Publication Data

US 2005/0080823 A1    Apr. 14, 2005

Related U.S. Application Data

(60) Provisional application No. 60/510,441, filed on Oct. 10, 2003.

(51) Int. Cl.
*G06F 12/00* (2006.01)

(52) U.S. Cl. ................... 711/220; 711/221

(58) Field of Classification Search ............ None
See application file for complete search history.

(56) References Cited

U.S. PATENT DOCUMENTS

| | | |
|---|---|---|
| 5,001,628 A | 3/1991 | Johnson et al. |
| 5,008,814 A | 4/1991 | Mathur |
| 5,113,519 A | 5/1992 | Johnson et al. |
| 5,151,989 A | 9/1992 | Johnson et al. |
| 5,155,847 A | 10/1992 | Kirouac et al. |
| 5,212,789 A | 5/1993 | Rago |
| 5,276,871 A | 1/1994 | Howarth |
| 5,278,979 A | 1/1994 | Foster et al. |
| 5,278,982 A | 1/1994 | Daniels et al. |
| 5,313,646 A | 5/1994 | Hendricks et al. |

(Continued)

FOREIGN PATENT DOCUMENTS

EP    0774721    5/1997

(Continued)

OTHER PUBLICATIONS

Birrell, A., et al., "Grapevine: An Exercise in Distributed Computing," Apr. 1982, Communications of the ACM, vol. 25, No. 4, (15 pages).

(Continued)

*Primary Examiner*—Reginald G Bragdon
*Assistant Examiner*—Ngoc V Dinh
(74) *Attorney, Agent, or Firm*—Meyertons, Hood, Kivlin, Kowert & Goetzel, P.C.; Eric B. Meyertons

(57) ABSTRACT

A system and method for generating and updating a file system on a client computer. An original file system may be compared to an updated file system and the differences between the two file systems may be defined in specific data blocks. The differences may include new data blocks, modified data blocks, and data blocks that have been deleted. The new data blocks or modified data blocks may be sent to the client computer along with reference file updates to update the file system on the client computer. A virtual file system on the client computer may be created using the set of data blocks and the reference files to point to which data blocks contain the data for specific files. As the file system is updated, new data blocks and modified data blocks may replace deleted data blocks in the set of data blocks.

64 Claims, 14 Drawing Sheets

U.S. PATENT DOCUMENTS

| | | | |
|---|---|---|---|
| 5,317,728 A | 5/1994 | Tevis et al. |
| 5,325,524 A | 6/1994 | Black et al. |
| 5,347,653 A | 9/1994 | Flynn et al. |
| 5,355,476 A | 10/1994 | Fukumura |
| 5,377,326 A | 12/1994 | Murata et al. |
| 5,390,335 A | 2/1995 | Stephan et al. |
| 5,403,639 A | 4/1995 | Belsan et al. |
| 5,418,957 A | 5/1995 | Narayan |
| 5,434,994 A | 7/1995 | Shaheen et al. |
| 5,546,539 A | 8/1996 | Poling |
| 5,581,740 A | 12/1996 | Jones |
| 5,644,782 A | 7/1997 | Yeates et al. |
| 5,706,510 A | 1/1998 | Burgoon |
| 5,721,907 A | 2/1998 | Pyne |
| 5,729,743 A | 3/1998 | Squibb |
| 5,742,820 A | 4/1998 | Perlman et al. |
| 5,745,906 A | 4/1998 | Squibb |
| 5,752,005 A | 5/1998 | Jones |
| 5,754,774 A | 5/1998 | Bittinger et al. |
| 5,757,669 A | 5/1998 | Christie et al. |
| 5,765,173 A | 6/1998 | Cane et al. |
| 5,778,395 A | 7/1998 | Whiting et al. |
| 5,781,912 A | 7/1998 | Demers et al. |
| 5,799,187 A | 8/1998 | McBrearty |
| 5,806,075 A | 9/1998 | Jain et al. |
| 5,806,078 A | 9/1998 | Hug et al. |
| 5,813,017 A | 9/1998 | Morris |
| 5,832,263 A | 11/1998 | Hansen et al. |
| 5,850,565 A | 12/1998 | Wightman |
| 5,859,971 A | 1/1999 | Bittinger et al. |
| 5,878,434 A | 3/1999 | Draper et al. |
| 5,881,287 A | 3/1999 | Mast |
| 5,978,805 A | 11/1999 | Carson |
| 5,991,771 A | 11/1999 | Falls et al. |
| 5,999,740 A | 12/1999 | Rowley |
| 6,003,087 A | 12/1999 | Housel, III et al. |
| 6,018,747 A | 1/2000 | Burns et al. |
| 6,038,612 A | 3/2000 | Liow |
| 6,101,507 A | 8/2000 | Cane et al. |
| 6,128,652 A | 10/2000 | Toh et al. |
| 6,199,204 B1 | 3/2001 | Donohue |
| 6,202,207 B1 | 3/2001 | Donohue |
| 6,233,589 B1 | 5/2001 | Balcha et al. |
| 6,243,328 B1 | 6/2001 | Fenner et al. |
| 6,269,370 B1 | 7/2001 | Kirsch |
| 6,275,953 B1 | 8/2001 | Vahalia et al. |
| 6,308,283 B1 | 10/2001 | Galipeau et al. |
| 6,341,310 B1 | 1/2002 | Leshem et al. |
| 6,366,933 B1 | 4/2002 | Ball et al. |
| 6,367,077 B1 | 4/2002 | Brodersen et al. |
| 6,401,239 B1 | 6/2002 | Miron |
| 6,411,952 B1 | 6/2002 | Bharat et al. |
| 6,434,683 B1 | 8/2002 | West et al. |
| 6,449,652 B1 | 9/2002 | Blumenau et al. |
| 6,564,307 B1 | 5/2003 | Micka et al. |
| 6,604,236 B1 | 8/2003 | Draper et al. |
| 6,654,741 B1 | 11/2003 | Cohen et al. |
| 6,665,342 B1 | 12/2003 | Brown et al. |
| 6,665,658 B1 | 12/2003 | DaCosta et al. |
| 6,665,837 B1 | 12/2003 | Dean et al. |
| 6,704,722 B2 | 3/2004 | Wang Baldonado |
| 6,718,350 B1 | 4/2004 | Karbowski |
| 6,763,467 B1 | 7/2004 | Radatti et al. |
| 6,804,784 B1 | 10/2004 | Friedman et al. |
| 6,973,578 B1 | 12/2005 | McIchionc |
| 6,993,530 B2 * | 1/2006 | Lee et al. ............... 707/100 |
| 7,028,251 B2 | 4/2006 | Draper |
| 7,065,506 B1 | 6/2006 | Phillipo et al. |
| 2002/0099666 A1 | 7/2002 | Dryer et al. |
| 2002/0103823 A1 | 8/2002 | Jackson et al. |
| 2003/0004990 A1 | 1/2003 | Draper |
| 2003/0033303 A1 | 2/2003 | Collins |
| 2003/0191737 A1 | 10/2003 | Steele et al. |
| 2004/0205587 A1 | 10/2004 | Draper |

FOREIGN PATENT DOCUMENTS

| | | |
|---|---|---|
| EP | 0 994 425 | 4/2000 |
| EP | 1 031 910 | 8/2000 |
| JP | 04-0242829 | 8/1992 |
| JP | 05-091550 | 9/1993 |
| WO | 97/02688 | 1/1997 |

OTHER PUBLICATIONS

Stonebraker, M., "Concurrency Control and Consistency of Multiple Copies of Data in Distributed INGRES," May 1979, IEEE Transactions on Software Engineering, vol. SE-5, No. 3, (7 pages).

Hazboun, K.A., et al., "A Multi-Group Technique for Data Compression," Jun. 1982, ACM SIGMOD Conference, (10 pages).

Spector, A. Z., "Performing Remote Operations Efficiently on a Local Computer Network," Apr. 1982, Communications of the ACM, vol. 25, No. 4, (15 pages).

Joseph, T. A., "Low Cost Management of Replicated Data in Fault-Tolerant Distributed Systems," Feb. 1986, ACM Transactions on Computer Systems, vol. 4, No. 1, (17 pages).

Lindsay, B., et al., "A Snapshot Differential Refresh Algorithm," May 1986, ACM SIGMOD International Conference on Management of Data, (9 pages).

Black, A.P., Burris, C.H., Jr., "A Compact Representation for File Versions: A Preliminary Report," Feb. 1989, IEEE Conference on Data Engineering, (10 pages).

Gladney, H.M., "Data Replicas in Distributed Information Services," Mar. 1989, ACM Transactions on Database Systems, vol. 14, No. 1, (23 pages).

El Abbadi, A., Toueg, S., "Maintaining Availability in Partitioned Replicated Databases," Jun. 1989, ACM Transactions on Database Systems, vol. 14, No. 2, (27 pages).

Satyanarayanan, M., et al., "Coda: A Highly Available File System for a Distributed Workstation Environment," Apr. 1990, IEEE Transactions on Computers, vol. 39, No. 4, (12 pages).

Satyanarayanan, M., "Scalable, Secure, and Highly Available Distributed File Access," May 1990, IEEE Computer, vol. 23, No. 5, (12 pages).

Kistler, J., Satyanarayanan, M, "Disconnected Operation in the Coda File System," Oct. 1991, ACM Operating Systems Review, vol. 25, No. 5, (14 pages).

Liskov, B., et al., "A Replicated Unix File System (Extended Abstract)," Jan. 1991, ACM Operating Systems Review, vol. 25, No. 1, (6 pages).

Liskov, B., et al., "Replication in the Harp File System," Oct. 1991, ACM Operating Systems Review, vol. 25, No. 5, (14 pages).

Agrawal, D., El Abbadi, A., "The Generalized Tree Quorum Protocol: An Efficient Approach for Managing Replicated Data," Dec. 1992, ACM Transactions on Database Systems, vol. 17, No. 4, (29 pages).

Alonso, R., Korth, H., "Database System Issues in Nomadic Computing," May 1993, Proc. Of the 1993 ACM SIGMOD International Conference on Management of Data, vol. 22, Issue 2, (6 pages).

Badrinath, B., "Impact of Mobility on Distributed Computations," Apr. 1993, ACM Operating Systems Review, vol. 27, No. 2, (7 pages).

Reddy, P., Bhalla, S., "A Non-blocking Transaction Data Flow Graph Based Approach For Replicated Data," Jul. 1993, ACM Operating Systems Review, vol. 27, No. 3, (10 pages).

Colton, M., "Replicated Data in a Distributed Environment," May 1993, Proc. Of the 1993 ACM SIGMOD International Conference on Management of Data, vol. 22, Issue 2, (4 pages).

Imielinski, T., Badrinath, B., "Data Management for Mobile Computing," Mar. 1993, SIGMOD Record, vol. 22, No. 1, (6 pages).

Satyanarayanan, M., et al., "Applications-Aware Adaptation for Mobile Computing," Jan. 95, ACM Operating Systems Review, vol. 29, No. 1, (5 pages).

Franky, M., "DGDBM: Programming Support for Distributed Transactions Over Replicated Files," Jul. 1995, ACM Operating Systems Review, vol. 29, No. 3, (12 pages).

Maffeis, S., et al., "A Generic Multicast Transport Service to Support Disconnected Operation," Apr. 1995, Proc. of the Second USENIX Symposium on Mobile and Location-Independent Computing, (12 pages).

Moore, K., "The Lotus Notes Storage System," May 1995, ACM SIGMOD Record, vol. 24, No. 2, (2 pages).

Huston, L., Honeyman, P., "Partially Connected Operation," Apr. 1995, Proc. of the Second USENIX Symposium on Mobile and Location-Independent Computing, (8 pages).

Montenegro, G., Drach, S., "System Isolation and Network Fast-Fail Capability in Solaris," Apr. 1995, Proc. of the Second USENIX Symposium on Mobile and Location-Independent Computing, (12 pages).

Allard, H., "Remote Access Can't Slow Down," Feb. 1996, Network World, vol. 13, No. 8, (2 pages).

"How Mobile is your Intranet?," Whitepaper, Iora, Sep. 25, 2000 (15 pages).

"iOra Mobile Intranet: Managing Mobile Content," Iora, Sep. 25, 2000 (4 pages).

"iOra Mobile Intranet: Managing Mobile Content," Iora brochure, Sep. 25, 2000 (6 pages).

"iOra Mobile Intranet dramatically improves offline and slowline access for mobile users," Press release, Sep. 25, 2000 (3 pages).

"iOra integrates offline access to Lotus Domino and Microsoft/Netscape based Intranets," Press release, Sep. 26, 2000 (2 pages).

U.S. Appl. No. 09/476,723, filed Dec. 30, 1999 (52 pages).

Office Action mailed Feb. 11, 2004, U.S. Appl. No. 09/476,723 (45 pages).

Anglin, et al. "Changed Data Only Back-up and Recovery", IBM Technical Disclosure Bulletin, IBM Corp. New York, Mar. 1996 (4 pages).

* cited by examiner

SYSTEMS AND METHODS FOR MODIFYING A SET OF DATA OBJECTS

PRIORITY CLAIM

This application claims benefit of priority of U.S. provisional application Ser. No. 60/510,441 titled "Systems and Methods for Modifying a Set of Data Objects" filed Oct. 10, 2003, whose inventor is Brian Collins.

BACKGROUND OF THE INVENTION

1. Field of the Invention

The present invention generally relates to systems and methods for representing data. More particularly, the present invention relates to systems and methods for representing modifications to a set of data objects.

2. Description of the Related Art

As people become increasingly reliant on computer systems for day-to-day business, the number and type of computer systems people use is increasing. Because personal computers and laptops may be too bulky to carry around throughout the day, personal digital assistants (PDAs) and other hand held devices may be used throughout the day to store information (e.g., information concerning appointments, contact information, etc.). Hand held devices may also used to store information from a personal computer/laptop that may need to be referenced throughout the day.

Because new and/or modified information may be added to a personal computer/laptop and new and/or modified information may be added to a hand-held device separately, the hand-held device and the personal computer/laptop may have inconsistent information in storage relative to the other. To synchronize the information stored on the hand-held device and the personal computer/laptop, files from the personal computer may be copied onto the hand-held device and files from the hand-held device may be copied onto the personal computer/laptop. This procedure, however, may be time consuming and may risk overwriting new information as files are either copied first from the personal computer/laptop to the hand-held device or from the hand-held device to the personal computer/laptop. In addition, keeping older copies of newly updated files may not be possible on a space-constrained hand-held device.

SUMMARY OF THE INVENTION

In one embodiment, a basis index table identifying the data content of an original file system, a file of modification data blocks that may be used to modify the data content of the original file system, and a delta lookup table for identifying the data blocks in the original file system and the data blocks in the file of modification data blocks that provide the data content for a newer version of the original file system may be generated. The delta lookup table and the file of modification data blocks may be stored as "back up" copies of the file system. In another embodiment, the delta lookup table and the file of modification data blocks may be used to update a file system. The delta lookup table and the file of modification data blocks may be used by a computer system on which a copy of the original file system is stored to provide the data content for a newer version (e.g., one of multiple versions backed up) of the original file system in a way that appears to provide a single file system containing the newer version of the file system. In another embodiment, back-up copies of the original file system may not be stored, but instead only one set of data blocks corresponding to the new file system may be stored.

In one embodiment, the basis index table may be generated by building a basis directory entry meta-data table and a basis index data block table. The basis directory entry meta-data table may organize the meta-data for each entry in a directory enumeration of the original file system by entry name. In one embodiment, the entry name may identify the entry and its parent. The meta-data stored for each entry may be known meta-data such as file attributes. The basis index data block table may uniquely identify each data block found within the original file system. For each unique data block identifier, a source file identifier that identifies the source file for the data block, the offset to the first data unit for the block within the source file, and the length of the data block may be stored. These two tables may be used to generate the files for generating a newer version of the file system.

In one embodiment, a delta directory map file to identify the structure of the entries in the newer version of the original file system, a delta lookup table (LUT) file for identifying the location of the data blocks to generate the files in the newer version of the original file system, and a delta modification data block file that contains the new data content for the newer version of the original file system may be generated. The delta directory map file may contain the name for the entries in the newer version of the original file system, the value of a modification status variable for the entries in the newer version of the file system, the meta-data for each entry having a modification status of "modified", "contents modified", or "new", the first lookup table record for each file entry, and the number of lookup table records used to construct the file in the newer version of the original file system. The delta lookup table may contain at least one LUT record for each file entry having a modification status of "contents modified" or "new". An LUT record may identify the source file containing the data block, the location of the first data unit of the data block in the identified source file, the length of the data block, and the offset of the first data unit of the data block in the file being processed. The source file identifier may either identify a file of the original file system or the modification data block file for the newer version. The LUT records for all of the files in the newer version of the original file system may be stored in an LUT file. The location of the first LUT record for a file may be identified by a pointer stored in the meta-data of the delta directory map file for file entries having a value of a modification status variable of "contents modified" or "new". The directory map file may also be used in a computer system having a copy of the original file system to generate information for display or use regarding the structure of the newer version of the original file system and its new data content. Structure data may include data that is displayed in response to a directory enumeration command or the like. The delta modification data block file may contain the data blocks having new data content for the file entries of the newer version of the original file system. As the data blocks for the new data content of the newer version of the original file system are stored in the delta modification data block file, a delta index data block table may be generated. This table may include a unique identifier for each data block stored in the delta data block modification file that has unique data content, an identifier that indicates the version of the delta data block modification file that is the source file for the block, the offset to the first data unit for the data block and the length of the data block. The delta index data block table may be appended to the basis index data block table. In another embodiment, the basis index data block table may be updated directly (i.e., no delta index data block table is used).

The delta directory map file, the delta modification data block file and the delta lookup table may be compressed and stored on storage media or downloaded to a computer system having a copy of the original file system. The downloaded delta directory map file, the delta modification data block file and the delta lookup table file may be used to seamlessly regenerate a newer version of the original file system. This regeneration of the newer version of the original file system may be done in a manner which gives the appearance that the contents of the device on which a copy of the original file system is stored have been modified, even if the device uses read-only media for storage of the original file system. Thus, the system and method of the present invention may provide a mechanism for updating the contents of a file system without requiring the production of a complete file system corresponding to the newer version of the program and/or data stored in the file system.

In one embodiment, the method and system of the present invention may be used to generate a representation of a newer version of an original file system with reference to the original file system and to the delta modification data block files for previous versions of the original file system. This use of previous versions may reduce the amount of data to be stored in the delta directory map file, delta modification data block file, and delta lookup table for the latest version of an original file system. In this embodiment, the process for generating the files for the newer version of the original file system may produce delta data block records that identify the source file for a data block as being either a file in the original file system, a delta modification data block file for a previous version of the original file system or the delta modification data block file for the newer version of the original file system. The version of the delta modification data block table containing a data block may be determined from the delta index data block tables appended to the basis index data block table.

In one embodiment, a publisher may provide a client computer system with update packets containing data blocks, file offsets for the data blocks, and reference file addendums, such as, but not limited to, DataLUT entries and DirMap entries to apply to a copy of a maintained set of data blocks and reference files on the client computer system. In one embodiment, the publisher and the client computer system may only maintain one copy of the maintained set of data blocks. For example, a delta modification data block table may not be used. In one embodiment, the client computer system may provide a virtual version of the file system using the updated maintained set of data blocks and updated reference files. In one embodiment, the file offsets may be used to place the new or modified data blocks in the maintained set of data blocks. In one embodiment, the maintained set of data blocks may be expanded with new data blocks and modified data blocks until the maintained set of data blocks reaches a predetermined size limit. The new data blocks and modified data blocks may be placed into free data blocks, such as, but not limited to, deleted data blocks, in the maintained set of data blocks. In one embodiment, the maintained set of data blocks may have all free data blocks filled with new data blocks and modified data blocks before the maintained set of data blocks is expanded.

BRIEF DESCRIPTION OF THE DRAWINGS

A better understanding of the present invention may be obtained when the following detailed description is considered in conjunction with the following drawings, in which.

Figure 1:
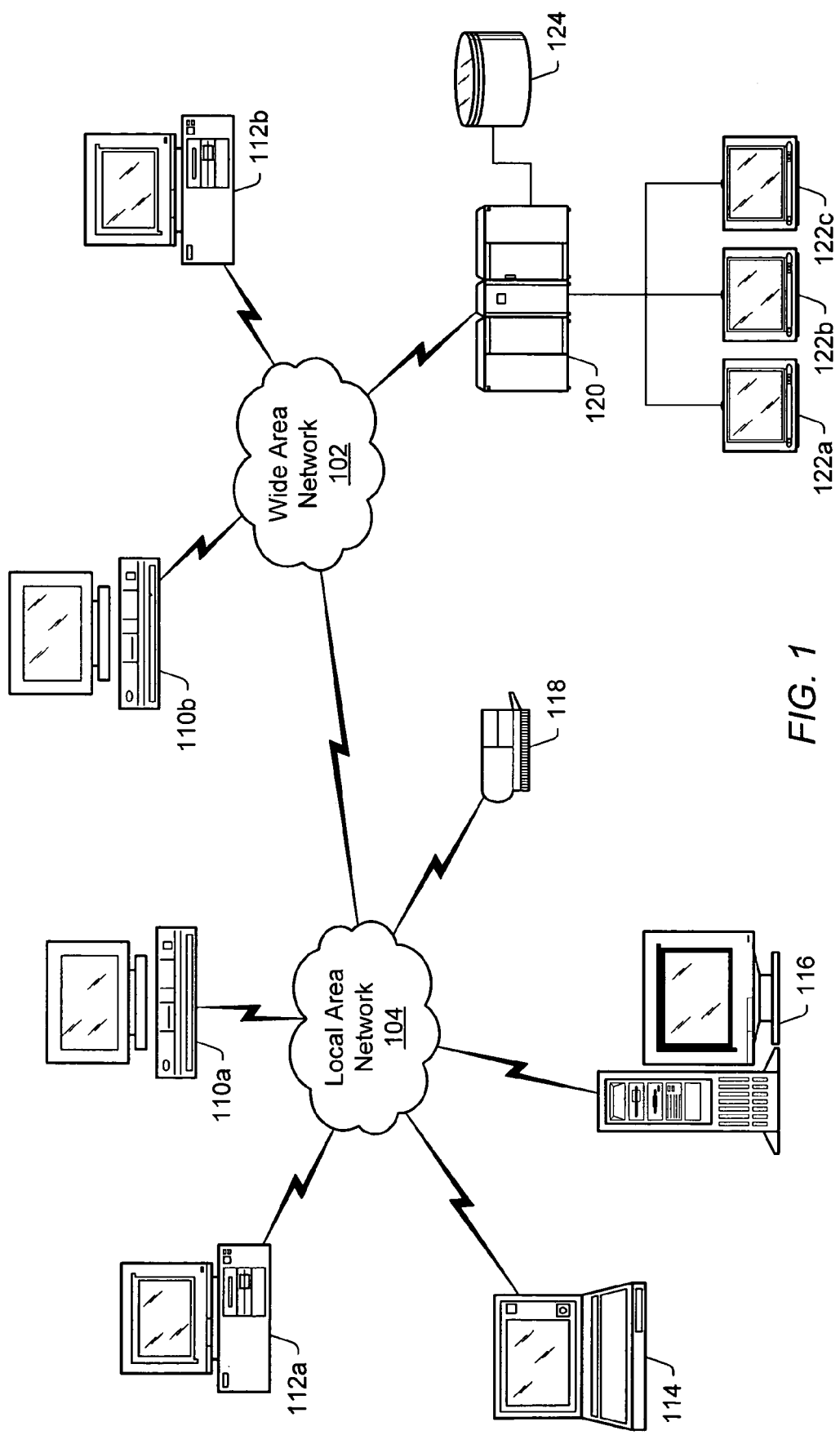
FIG. 1 is a network diagram of a wide area network that is suitable for implementing various embodiments.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF SEVERAL EMBODIMENTS

FIG. 1 illustrates a wide area network (WAN) according to one embodiment. A WAN 102 may be a network that spans a relatively large geographical area. The Internet may be an example of a WAN 102. A WAN 102 may include a plurality of computer systems which are interconnected through one or more networks. Although one particular configuration is shown in FIG. 1, the WAN 102 may include a variety of heterogeneous computer systems and networks which are interconnected in a variety of ways and which run a variety of software applications.

One or more local area networks (LANs) 104 may be coupled to the WAN 102. A LAN 104 is a network that spans a relatively small area. Typically, a LAN 104 is confined to a single building or group of buildings. In one embodiment, each node (i.e., individual computer system or device) on a LAN 104 may hve its own CPU with which it executes programs, and each node may also be able to access data and devices anywhere on the LAN 104. The LAN 104 may allow many users to share devices (e.g., printers) as well as data stored on file servers. The LAN 104 may be characterized by any of a variety of types of topology (i.e., the geometric arrangement of devices on the network), of protocols (i.e., the rules and encoding specifications for sending data, and whether the network uses a peer-to-peer or client/server architecture), and of media (e.g., twisted-pair wire, coaxial cables, fiber optic cables, radio waves).

Each LAN 104 may include a plurality of interconnected computer systems and optionally one or more other devices: for example, one or more workstations 110a, one or more personal computers 112a, one or more laptop or notebook computer systems 114, one or more server computer systems 116, and one or more network printers 118. As illustrated in FIG. 1, an example LAN 104 may include one of each of computer systems 110a, 112a, 114, and 116, and one printer 118. The LAN 104 may be coupled to other computer systems and/or other devices and/or other LANs 104 through the WAN 102.

One or more mainframe computer systems 120 may be coupled to WAN 102. As shown, mainframe 120 may be coupled to a storage device or file server 124 and mainframe terminals 122a, 122b, and 122c. Mainframe terminals 122a, 122b, and 122c may access data stored in storage device or file server 124 coupled to or included in mainframe computer system 120.

WAN 102 may also include computer systems that are connected to WAN 102 individually and not through a LAN 104: as illustrated, for purposes of example, a workstation 110b and a personal computer 112b. For example, WAN 102 may include computer systems that are geographically remote and connected to each other through the Internet.

Figure 2:
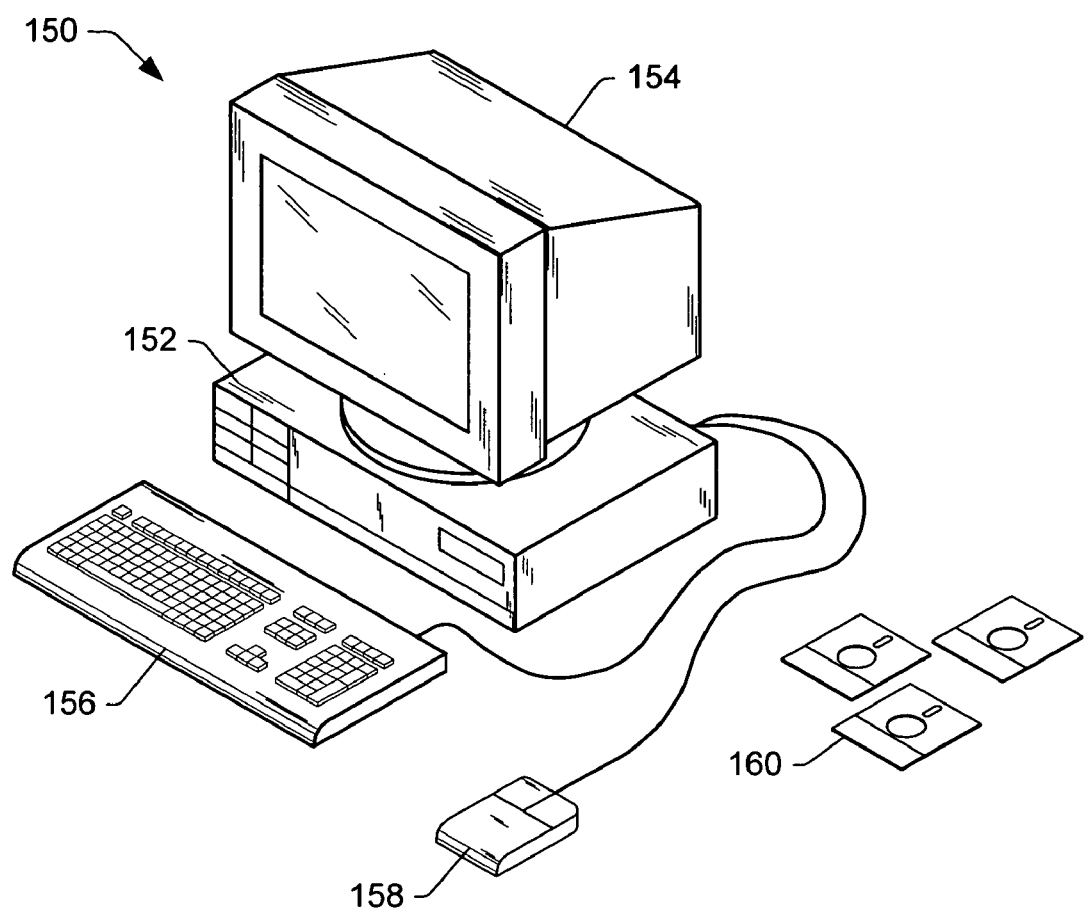
FIG. 2 is an illustration of a typical computer system that is suitable for implementing various embodiments.

FIG. 2 illustrates a typical computer system 150 that is suitable for implementing various embodiments of a system and method for representing modifications to a set of data objects. Each computer system 150 may include components such as a CPU 152 with an associated memory medium such as floppy disks 160. The memory medium may store program instructions for computer programs, wherein the program instructions are executable by the CPU 152. The computer system 150 may further include a display device such as a monitor 154, an alphanumeric input device such as a keyboard 156, and a directional input device such as a mouse 158. The computer system 150 may be operable to execute the computer programs to implement representation of modifications to a set of data objects as described herein.

The computer system 150 may include a memory medium on which computer programs according to various embodiments may be stored. The term "memory medium" is intended to include an installation medium, e.g., a CD-ROM, or floppy disks 160, a computer system memory such as DRAM, SRAM, EDO RAM, Rambus RAM, etc., or a non-volatile memory such as a magnetic media, e.g., a hard drive, or optical storage. The memory medium may include other types of memory as well, or combinations thereof. In addition, the memory medium may be located in a first computer in which the programs are executed, or may be located in a second different computer that connects to the first computer over a network. In the latter instance, the second computer may provide the program instructions to the first computer for execution. Also, the computer system 150 may take various forms, including a personal computer system, mainframe computer system, workstation, network appliance, Internet appliance, personal digital assistant (PDA), television system or other device. In general, the term "computer system" may be broadly defined to encompass any device having a processor that executes instructions from a memory medium.

In one embodiment, the memory medium may store a software program or programs for representing modifications to a set of data objects as described herein. The software program(s) may be implemented in any of various ways, including procedure-based techniques, component-based techniques, and/or object-oriented techniques, among others. For example, the software program may be implemented using ActiveX controls, C++ objects, JavaBeans, Microsoft Foundation Classes (MFC), browser-based applications (e.g., Java applets), traditional programs, or other technologies or methodologies, as desired. A CPU, such as the host CPU 152, executing code and data from the memory medium includes a means for creating and executing the software program or programs according to the methods and/or block diagrams described below.

Figure 3:
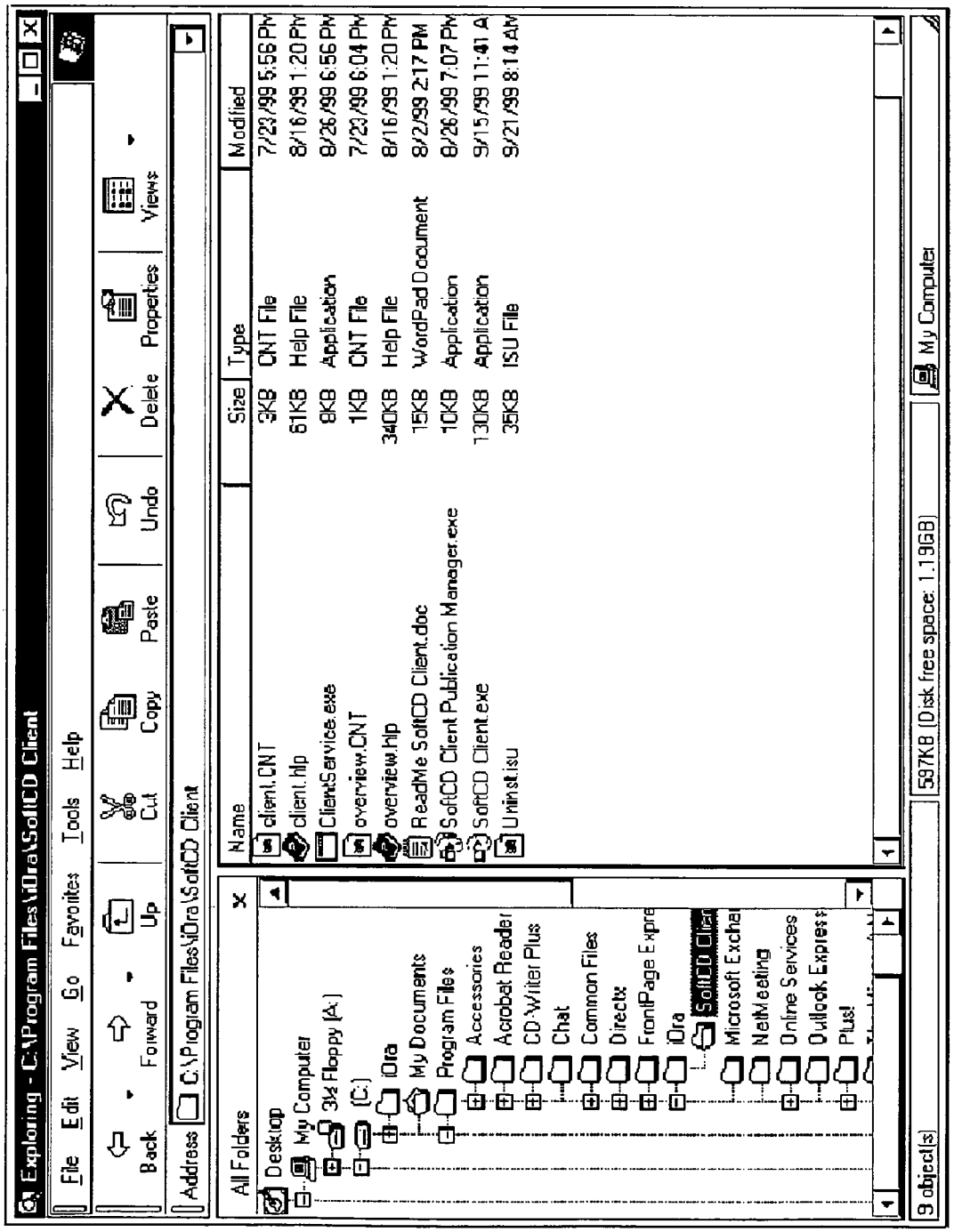
FIG. 3 is a screen shot of a file system hierarchy that is suitable for implementing various embodiments.

FIG. 3 illustrates a screen shot of a file system hierarchy according to one embodiment. The hierarchy for the file system may include a directory having a list of file entries and subdirectory entries. The subdirectory entries may include additional files for the file system. Each entry in the directory for the file system hierarchy may also contain meta-data. For the file entries the meta-data may include known file meta-data such as the file name, file attributes, and other known file meta-data.

Figure 4:
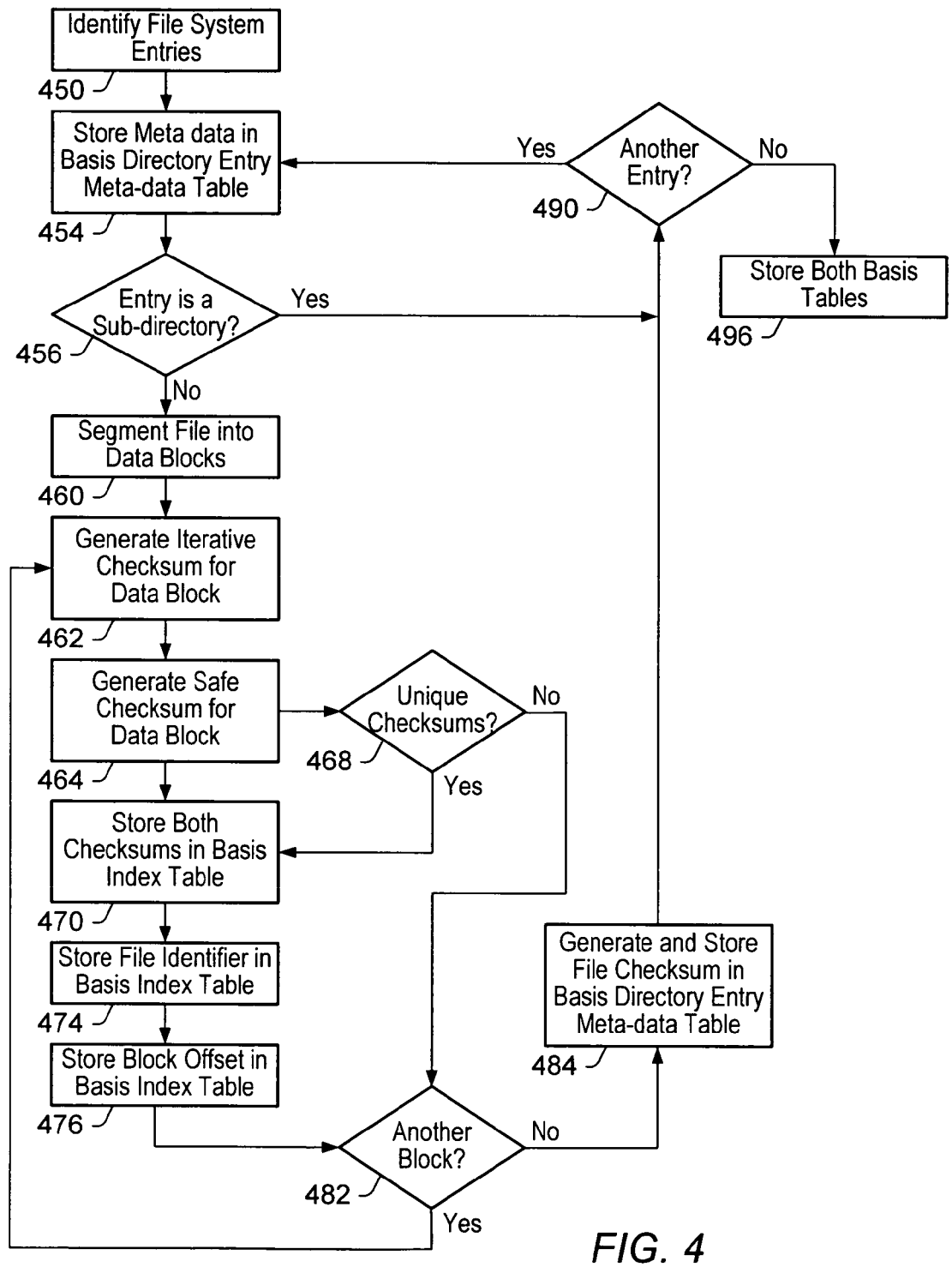
FIG. 4 is a flowchart of an exemplary process that generates required information about the original file system according to one embodiment.

FIG. 4 is a flowchart of an embodiment of a system and method for generating information about the original file system. In order to generate modification data files for a file system hierarchy, the original version of the file system hierarchy may be processed and information about the system is stored in a file system map file.

In 450, file system entries may be identified by processing the directory file for the highest level of the file system hierarchy. These file system entries may include subdirectories and/or files at the highest level in the file system.

In 454, meta-data for each entry may be stored in a basis directory meta-data table. As used herein, a "basis directory meta-data table" generally refers to a basis table including meta-data describing content of a file system hierarchy. As used herein, a "basis table" generally refers to a table including data describing a file system, etc before the file or file system is modified. For example, a basis table may provide a baseline against which future modifications may be compared. Examples of basis tables may include, but are not limited to, an index data block table. In 456, it may be determined if the entry is a subdirectory. If the entry is a subdirectory, in 490, the process may determine whether another entry exists for processing. If another entry exists, processing may loop back to 454. If another entry does not exist, 496 may be reached in which the process terminates. If the entry is not a subdirectory, processing my continue with 460.

In 460, file entries may be segmented into data blocks of one or more fixed lengths (e.g., if the fixed length is 256, there are 256 data units in the data block). In one embodiment, the block length(s) may be chosen so that the entire basis index data block table may be held in the memory of the computer system. An advantage to choosing such a block length is that every block of memory may be directly and efficiently accessed. For this reason, the block length may be determined as a function of the available computer system resources. Additionally, the sub-block-sized remainder at the end of the file may also be treated as a block.

In 462, an iterative checksum may be generated for each data block. Similarly, in 464, a safe checksum may be generated for each data block. The iterative checksum may be a value that is computed from the data values for each byte within a data block beginning at the first byte of the data block and continuing through to the last byte in the data block. It is noted that the iterative checksum for a particular data block which includes the first N data units in a data string may be used to generate the iterative checksum for the next data block comprised of the N data units beginning at the second data byte. This may be done by performing the inverse iterative checksum operation on the iterative checksum using the data content of the first data unit of the first data block to remove its contribution to the iterative checksum and performing the iterative checksum operation on the resulting value using the N+1 data unit that forms the last data unit for the next data block. Thus, two data operations may be used to generate the iterative checksum for the next data block in a data string in which the successive data blocks are formed by using a sliding data window in the data string. For example, an addition operation may be used to generate an iterative checksum having the property noted above.

The size and complexity of a safe checksum may be sufficiently large that the risk of a false match (i.e., producing the same checksum for two data blocks having different data contents) may be less likely to cause a failure than the risk that other components of the complete computer system (e.g., the storage media) may cause a failure (i.e., returning an inaccurate data value).

A safe checksum generation method well known within the data communication art is the MD5 checksum. The iterative and safe checksum pair for a data block form a checksum identifier that may be used to identify the data block. The iterative checksum may not be as computationally complex as the safe checksum so the iterative checksum may be a relatively computational resource efficient method for determining that two data blocks may be the same. The safe checksum may be used to verify that the data content of the blocks are the same and reduce the likelihood of a false positive identification.

In 468, the checksum identifier for the current data block may be compared with the checksum identifiers for data blocks previously stored in the index data block table. If the checksum identifier for the current data block is found to be the same as the checksum identifier for a previously stored data block, the data content of the data block may not be unique, and processing may continue with 482. Thus, the data block record already in the index data block table for the corresponding checksum identifier may adequately define the data block being processed so the checksum identifier is not stored in the index data block table. It is noted that if the checksum identifier for the current data block is found to be different than the checksum identifier for previously stored data blocks (e.g., the checksum identifier is unique), processing may continue with 470, 474, 476, and 482.

In 470, the iterative checksum may be stored as the primary key in the index data block table and the safe checksum may be stored in the index data block table as a qualified key. Associated with the checksum identifier for the block may be an identifier for the file from which the data block came, this identifier may be stored in 474. The offset from the first byte within the file to the first byte in the data block may be stored in 476. In one embodiment, the source file identifier may be the name of the file in which the data block is stored, but it may be a pointer to the meta-data in the basis directory entry meta-data table for the source file.

In 482, it may be determined whether another data block exists for a particular file entry. If another data block does exist, processing may loop back to 462. Otherwise, processing may continue with 484.

In 484, a safe checksum for the entire data content of the file entry may be generated and stored in the basis directory entry meta-data table. In 490, the process may determine whether another entry exists for processing. If another entry exists, processing may loop back to 454. If all entries for the entire directory structure for the original file system have been processed, processing may continue with 496.

In 496, the basis directory entry meta-data table and an basis index data block table file system map file representing the meta-data and data content for each entry within the file system hierarchy may be stored on storage media. In one embodiment, the basis index data block table file system may file may be created by the computer each time the file system is updated. This data may form the baseline for generating modification data files for updating the original file system. In one embodiment, the basis directory entry meta-data table and the basis index data block table may form a representation of the file system and the contents of the file system.

Figure 5A:
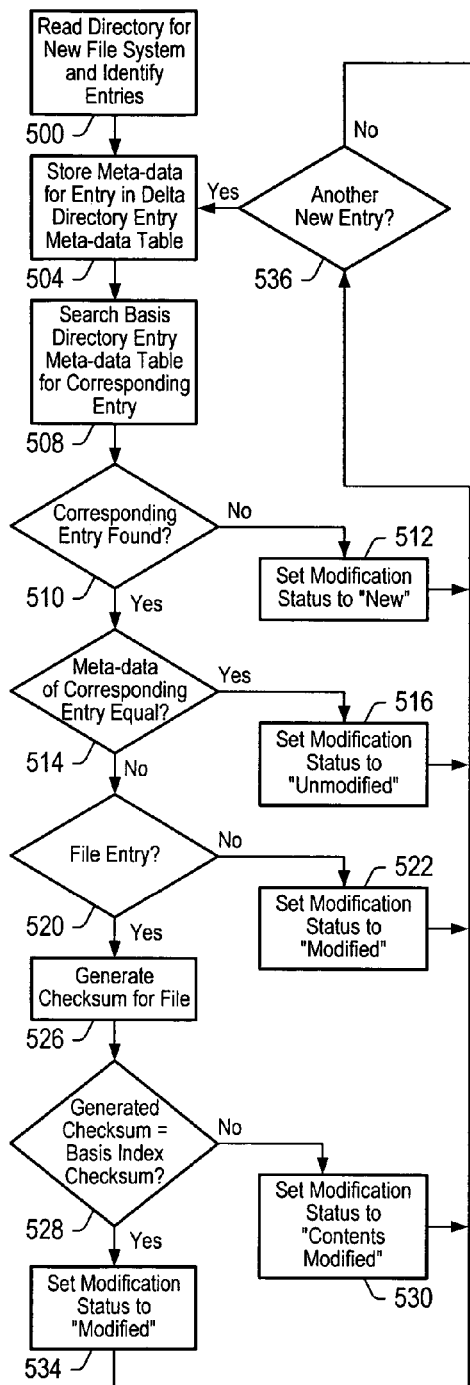
FIGS. 5a, 5b, and 6 are flowcharts of an exemplary process that generates the lookup table file and modification data block file for an update to the representation of the original file system generated by the process shown in FIG. 4 according to one embodiment.
Figure 5A:
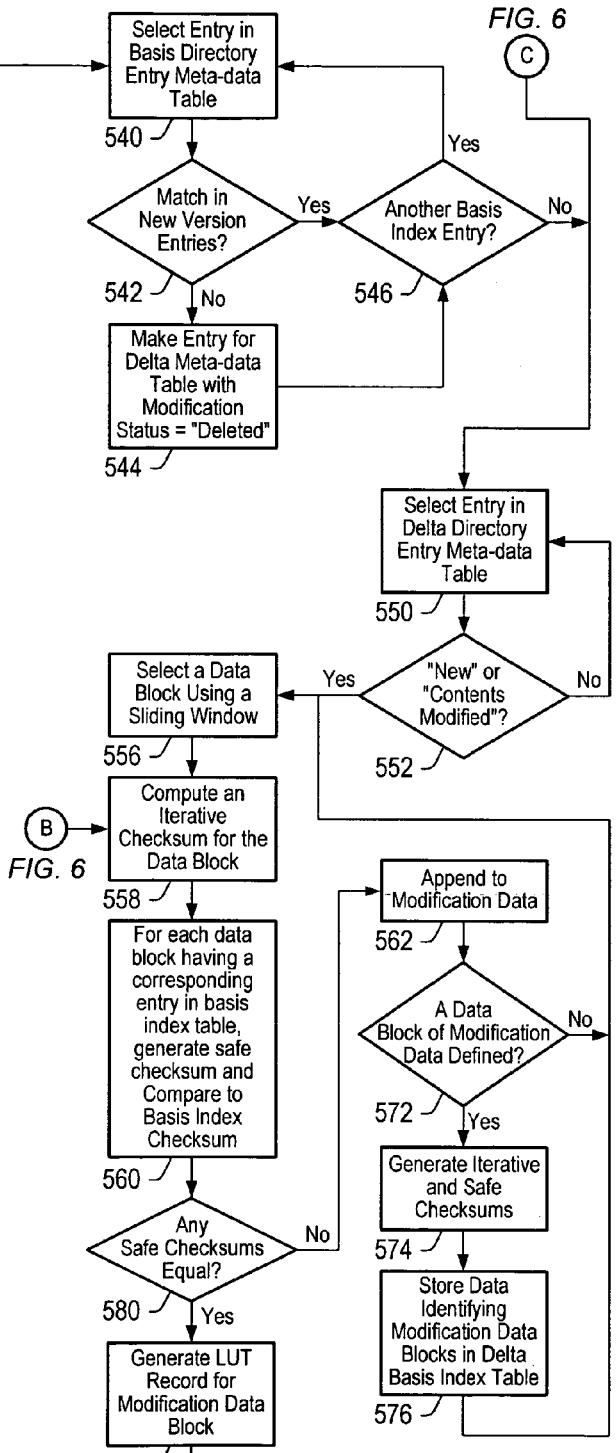
Figure 5B:
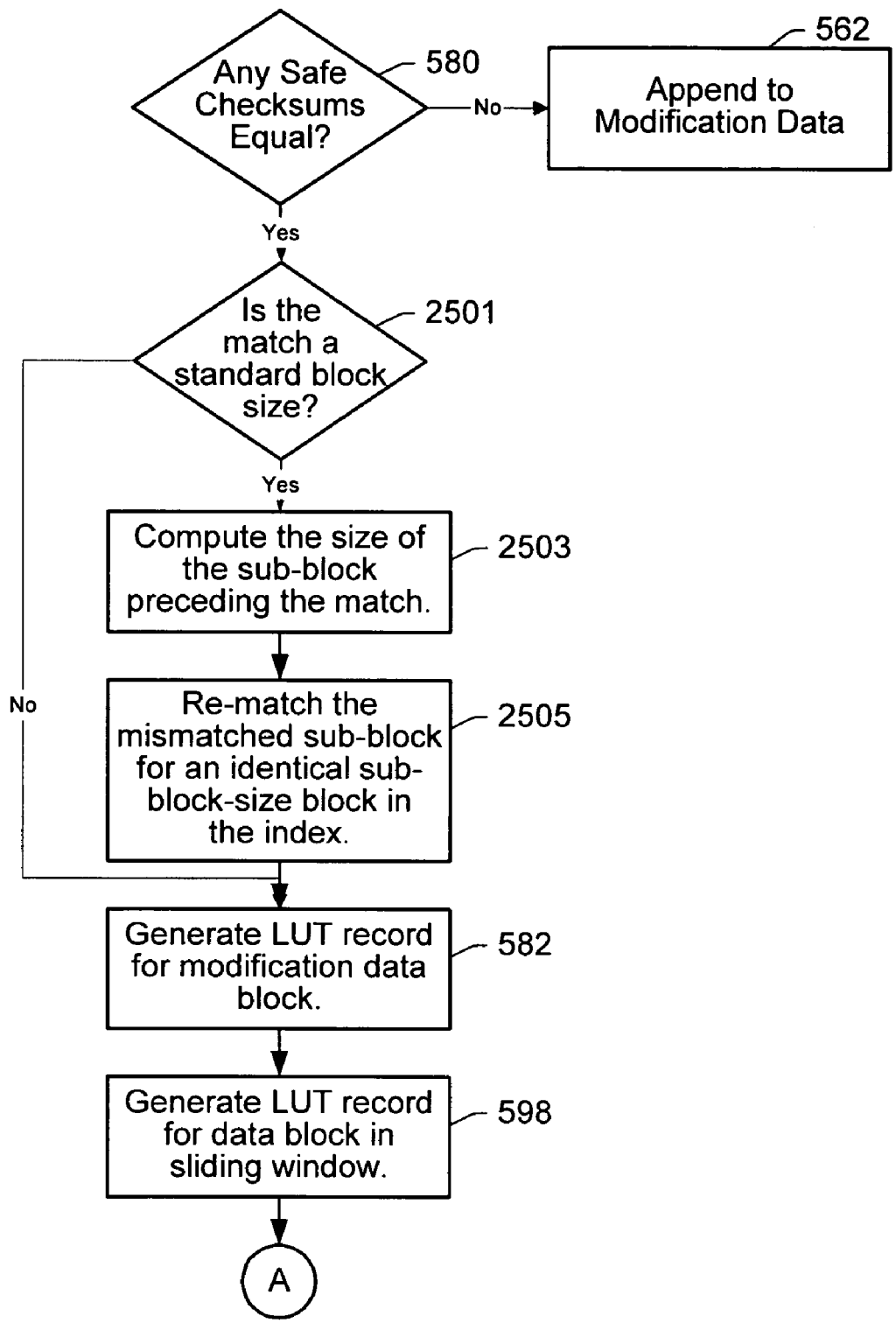
Figure 6:
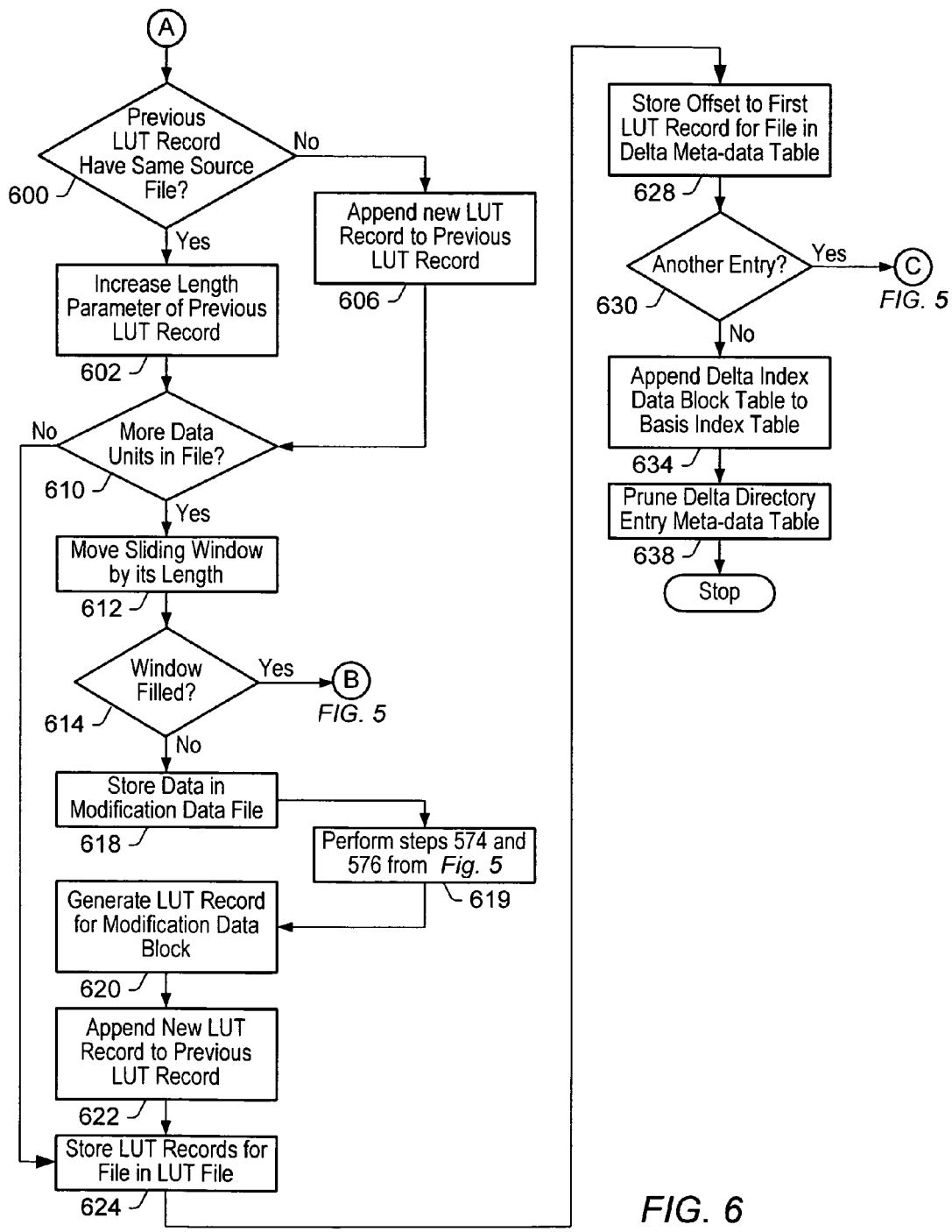

FIGS. 5a, 5b, and 6 are flowcharts of an embodiment of a system and method for generating a lookup table file (e.g., a delta lookup table file) and a modification data block file (e.g., a delta modification data block file may contain a subdirectory or file that is changed, deleted, or added) for an update to the representation of the original file system generated by the process shown in FIG. 4. Whenever a new version of a file system hierarchy is generated, either by changing, deleting or adding data to a file or its meta-data or by adding or deleting data files to the file system, a delta modification data block file and delta lookup table may be generated to provide the update information for the differences between the original file system hierarchy and the new version of the file system hierarchy. It is noted that on a space-constrained platform, the delta modification data block file may not be constructed.

In 500, the directory file for the new file system hierarchy may be read and entries for the subdirectories and files in the file system hierarchy may be identified. The meta-data for each entry (i.e., subdirectory or file) may be stored in a delta directory entry meta-data table in 504.

In 508, the basis directory entry meta-data table may be searched for an entry having the same name under the same parent as the entry currently being processed. In 510, if an entry is found in the basis directory entry meta-data table that corresponds to the entry currently being processed, 514 may be processed; otherwise, 512 may be processed.

In 512, 516, 522, 530 and 534, the value for a modification status variable may be set for the entry in the new file system hierarchy, as follows: 512 may set the modification status variable to "new", 516 may set the modification status variable to "unmodified", 522 may set the modification status variable to "modified", 530 may set the modification status variable to "contents modified", and 534 may set the modification status variable to "modified". The modification status variable may be stored in the delta directory entry meta-data table.

In 514, if the meta-data for the entry currently being processed (which was stored in the delta directory entry meta-data table in 504) is the same as the meta-data for the entry in the basis directory entry meta-data table, 516 may be processed; otherwise, 520 may be processed.

In 520, if the entries are not files, 522 may be processed; otherwise, 526 may be processed. In 526, a safe checksum may be generated for the entry currently being processed (e.g., the data contents of the file entry in the new file system). In one embodiment, the iterative and/or safe checksum may be generated for the entry currently being processed.

In 528, the safe checksum computed in 526 may be compared to the safe checksum for the entire data content of the file stored in the basis directory entry meta-data table. If the two safe checksums are equal, 534 may be processed; otherwise, 530 may be processed. In one embodiment, the iterative and/or safe checksum computed in 526 may be compared to the iterative and/or safe checksum for the entire data content of the file stored in the basis directory entry meta-data table.

Following 512, 516, 522, 530 or 534, processing may continue with 536. In 536, it may be determined if another new entry is to be processed. If another new entry exists, processing may loop back to 504. If all entries in the new version of the original file system have been processed, processing may continue with 540.

In 540, a directory entry in the basis directory entry meta-data table may be selected and the delta directory entry meta-data table may be searched for a corresponding entry. The outcome of the search may be processed in 542: if no corresponding entry is located, 544 sets the modification status variable to "deleted" and an identifier for the entry may be stored in the delta directory entry meta-data table, processing may continue with 546. It is noted that 546 may also be processed if a corresponding entry is located.

In 546, it is determined if another basis index entry (e.g., an entry in the basis directory entry meta-data table) is to be processed. If another basis index entry exists, processing may loop back to 540. If all entries in the basis index directory entry meta-data table have been checked, processing may continue with 550.

In 550, an entry in the delta directory entry meta-data table may be selected. In 552, it may be determined whether the selected entry's modification status variable has a value of "new" or "contents modified". If the value of the modification status variable is either "new" or "contents modified", lookup table (LUT) records may be generated and data blocks stored in the delta modification data block file, if necessary, and processing may continue with 556. If the modification status variable has any other value, processing may loop back to 550.

In 556, a sliding window of N data units (e.g., 256 bytes) may be used to define data blocks. As noted before (see 460), the number N may be one of the block sizes used to segment files in the original file system for constructing the basis index data block table.

In 558, an iterative checksum may be computed for the first data block formed by the sliding window being placed at the first data unit of the data contents of the "new" or "contents modified" file. Because the iterative checksum has the property discussed above, the iterative checksum for each successive data block may only require calculations to remove the contribution of the data units removed from the block by moving the sliding window and to add the contributions of the data units added by moving the sliding window.

In 560, the iterative checksum computed in 558 for the first data block may be compared to the iterative checksums of the checksum identifiers stored in the basis index data block table to determine whether a corresponding entry may exist. If a corresponding entry exists in the basis index data block table, the safe checksum for the first data block may be computed and compared to the safe checksums of the checksum identifiers selected from the basis index data block table. Only one, if any, safe checksum of the checksum identifiers may be the same as the safe checksum computed for the first data block. An iterative checksum may be computed for each successive data block (as discussed in 558), and each iterative checksum may be compared to the iterative checksums of the checksum identifiers stored in the basis index data block table to determine whether a corresponding entry may exist. If a corresponding entry exists in the basis index data block table for any particular successive data block, the safe checksum for that particular data block may be computed and compared to the safe checksums of the checksum identifiers selected from the basis index data block table. Only one, if any, safe checksum of the checksum identifiers should be the same as the safe checksum computed for each successive data block.

In 580, if a corresponding safe checksum is identified, the data blocks may be the same (i.e., a match has been found), and processing may continue with 582; otherwise, processing may continue with 562 (see below).

In one embodiment, when a match is found in 580, in 2501 (see FIG. 5b), if that match is of a standard block size, the size of the sub-block immediately preceding the match may be computed in 2503 and that mismatched sub-block may be re-matched for an identical sub-block-size block in the index in 2505. Following the sub-block matching process, processing may continue after the already matched sliding window. In one embodiment, if the match is not of a standard block size, processing may continue at 582. In one embodiment, if a match is not found, processing may continue at 562 (see FIG. 5a). Other processes are also contemplated.

For example, if a fixed length data block is 256 bytes, there may be up to 255 sub-blocks for the fixed length data block (i.e., sub-block 1 of 256, containing 1 byte; sub-block 2 of 256, containing 2 bytes; up to sub-block 255, containing 255 bytes). The size of these arbitrary sub-blocks may be identified when a match occurs at the standard block size.

This embodiment of indexing all sub-block size mismatches may allow the matching of sub-blocks that typically occur at the ends of files. Additionally, indexing sub-blocks insures that data added subsequently to the baseline version is fully indexed for subsequent matching. Indexing of sub-blocks may insure full indexing because matches against existing indexes (e.g., the baseline version or some subsequent version) may break up the data and leave holes that are less than block size.

For example, consider the case of file A, present in the baseline version, which is modified by a second version to state A', with two copies of A' being present in the second version. Further suppose that A' is simply A with one byte removed from offset 0. When the data of the second version is processed, no match may be found on the first (e.g., 256 byte) block in the first instance of A'. However, a match may be found at offset 255 (i.e., the match being the base state A at offset 256). Hence 255 bytes may be added to the delta modification data block file and the first instance of A' may reference the data from there. If the sub-block indexing embodiment were not implemented, however, those 255 bytes (i.e., less than standard block size of 256 bytes) may not be indexed. Consequently, when the second instance of A' is processed, if the sub-block indexing embodiment is not implemented, the same 255 bytes may be added for a second time to the delta modification data block file and the second instance of A' may reference the data from there. Similarly, subsequent modifications may continue to add another copy of the same 255 bytes to the delta modification data block file (if the sub-block indexing embodiment is not implemented).

In 562, data units of the data block may be appended to the delta modification data block file if either of the following conditions exist: (1) there is no corresponding iterative checksum in the basis index data block table for the data unit; or (2) the safe checksum for the data unit does not match the safe checksums of the checksum identifiers selected from the basis index data block table. As noted above, on a space-constrained platform, the delta modification data block file may not be constructed.

In 572, the cumulative number of data units stored in the delta modification data block file in 562 may be compared to the number of data units for a data block. If these numbers are not equal, processing may loop back to 556 in which the sliding window may be moved to remove the previous data unit from the data block in the file being processed and to add the next data unit. If these numbers are equal, processing may continue with 574.

In 574, the iterative and safe checksums for the data block may be generated to form a checksum identifier for the data block. In one embodiment, the checksum identifier may represent the iterative and safe checksums. The iterative checksum and the safe checksum for the data block of modification data may be stored as the primary key and the qualified key, respectively, in a delta index data block table associated with the new version of the original file system.

In 576, an identifier of the delta modification data block file in which the data block is stored and the offset into that file that defines the location of the first data unit for the data block being processed may be stored in the delta index data block table in association with the iterative and safe checksums. Processing may loop back to 556 in which the sliding window is moved to remove the previous data unit from the data block in the file being processed and to add the next data unit.

In another embodiment, 576 may update the basis index data block table (rather than the delta index data block table) with the above noted information. That is, the basis index data block table may be updated to contain a basis index data block record for each new block of modification data as that block of modification data is processed. If this alternative 576 is used, 634 (see below) would no longer be necessary, as there would no longer be a delta index data block table. The new version of the file system hierarchy may contain new or modified files in which the same new block of modification data appears more than once, but the generated representation of the new version of the original file system hierarchy will only contain a single copy of the new block of modification data. For example, if the original file system hierarchy is empty, this embodiment may generate an efficiently compressed representation of a file system hierarchy.

In 582, a lookup table (LUT) record may be generated. On a space-constrained platform, the LUT record for the new data may refer to a block of data directly within the original source file (as selected in 550). On non-space constrained platforms, the LUT record may be generated for the data units stored in the delta modification data block file since the last corresponding checksum identifier was detected. That is, all of the data following the identification of the last data block that is also in the basis index data block table may be stored in the delta data modification file and the LUT record for that data indicates that the data is a contiguous block of data. The LUT record may be comprised of a delta modification data block file identifier, an offset from the first data unit in the modification data file to the contiguous data block stored in the modification data file, a number of data units in the contiguous data block stored in the modification data file, and an offset of the data block in the file currently being processed. The first three data elements in the LUT record may identify the source file for the data block in the new version of the original file system and its location in that file while the fourth data element defines the location of the data block in the file of the new version of the original file system. As discussed below, this may permit the application program that controls access to the new version of the original file system to not only know from where it may retrieve the data block but where it goes in the new version of the file. It is noted that if the delta modification data block file is empty, the LUT record may not be generated.

In 598, a new LUT record may be generated for the data block within the sliding window. At this point in the process, the checksum identifier for the data block within the sliding window may have been identified as being the same as a checksum identifier in the basis index data block table. As this block may already exist in a file in the original version of the file system, an LUT record may be generated to uniquely identify the data block within the sliding window. The LUT record for the data block that corresponds to the checksum identifier stored in the basis index data block table may include the same source file identifier as the one in the basis index data block table, the same offset from the start of the source file, the same data block length stored in the basis index data block table, and the offset of the data block in the file currently being processed.

In 600, if the previous LUT record for the file being processed has a source file identifier that is the same as the one for the newly generated LUT record for the data block within the sliding window and the newly generated LUT record is for a data block that is contiguous with the data block identified by the previous LUT record, processing may continue with 602; otherwise, processing may continue with 606. Following either 602 or 606, processing may continue with 610.

In 602, the length of the data block in the newly generated LUT record may be added to the length stored in the previous LUT record, and the newly generated LUT record may be discarded. This corresponds to the situation where contiguous blocks of the data in a file of the new version of the original file system may be the same as a group of contiguous blocks in a file of the original file system. Thus, one LUT record may identify a source for the contiguous group of blocks.

In 606, the newly generated LUT record may be appended to the previous LUT record. This corresponds to the situation where the data block for the newly generated LUT record may be either not contiguous with the data block of the previous LUT record or the data block for the newly generated LUT record may not be from the same source file as the data block of the previous LUT record.

In 610, it may be determined if additional data units exist in the file to be processed. If all data units in the file have been processed, processing may skip ahead to 624; otherwise, processing may continue with 612.

In 612, the sliding window may be moved by its length to capture a new data block. In 614, it may be determined whether the number of remaining data units fill the sliding window. If the sliding window is filled, processing may loop back to 558. Otherwise, processing may continue with 618.

In 618, the remaining data units may be stored in the delta modification data block file. As noted above, on a space-constrained platform, the delta modification data block file may not be constructed.

The processing for 619 may correspond to the processing for 574 and 576 from FIG. 5*a*. Refer to these processes (above) for the complete description.

In 620, a corresponding LUT record may be generated. On a space-constrained platform, the corresponding LUT record may refer to a block of data directly within the original source file. On non-space constrained platforms, the corresponding LUT record may refer to the delta modification data block, and the delta modification data block may be indexed as a sub-block-sized block containing the data at the end of the file.

The LUT records generated for the file being processed may be appended to the LUT records for other files previously stored in an LUT file for the new version of the original file system in 622. The LUT records for the file may be stored in the LUT file in 624. The offset for the first LUT record for the file being processed and the number of LUT records for this file may be stored in the meta-data of the delta directory entry meta-data table for the file being processed in 628.

In 630, it may be determined if another entry in the delta directory entry meta-data table remains to be processed. If another entry exists, processing may loop back to 550. If all entries in the delta directory entry meta-data table have been processed, processing may continue with 634. It is noted that if the alternative 576 is used (see above), 634 may be eliminated. In that case, processing would continue with 638.

In 634, the delta index data block table may be appended to the basis index data block table. In 638, the delta directory entry meta-data table for the entries in the new version of the original file system may be searched for any entries having a value of "unmodified" for the modification status variable. These entries and their meta-data may be removed (i.e., pruned) from the delta directory entry meta-data table unless they have a descendant having a value other than "unmodified" for the modification status variable.

In an embodiment that utilizes previous updates provided for the original file system, the above process may be modified to evaluate the delta index data block tables for previous versions of the original file system. Specifically, the process may search the basis index data block table file and the delta index data block tables file(s) for update versions to locate data blocks having corresponding iterative and safe checksums for corresponding "new" or "contents modified" files in the latest version. Additionally, the source of data blocks may also include delta modification data files for previous update versions of the original file system as well as the files of the original file system and the delta modification data block file for the latest version.

Alternatively, to limit the growth in the size of the LUT records for frequently modified files, each new LUT record may recursively reference the previous LUT record. This recursive referencing may significantly reduce the space consumed.

For example, consider a large database that changes frequently. The LUT records for this database (without recursive referencing) may quickly become fragmented (e.g., tens of thousands of LUT entries). Every version that contains a change to this database file may also contain a large amount of LUT data for this file alone, even if the total new data for the file is very small. Since the file is only slightly changed since the previous version, the LUT record for the current version may be logically very similar to that generated in the previous version. Suppose that the large database consists of 10,000 LUT entries each mapping exactly 100 bytes. If the current version (i.e., version N) modifies one byte at offset 10,000, without recursive referencing the current version may contain all 10,000 new LUT entries. Using recursive referencing, there may be 3 LUT entries, as follows: (1) 0-9999 to 0-9999 from amendment N−1; (2) 10000-10000 to 0 from new data; (3) 10001-999999 to 10001-999999 from amendment N−1. To reconstruct the correct LUT when desired, reference to the previous version's LUT record may be required.

Producing a recursive representation of the LUT record may be done by any known differencing algorithm (e.g., longest-common-subsequence matching) taking the new and old LUT records for the files in question as input. To allow this comparison, the source file references in the LUT records may be translated into a common logical identification space for both the old and the new LUT records. Specifically, the LUT record native representation wherein the source file is identified by its offset in the corresponding directory map may not be directly used without matching these directory map offsets back to their logical entities (e.g., the directory entries) as they may otherwise not necessarily match even for the same source file. This translation may be performed logically by the comparison function utilized by the differencing algorithm. Thus, when it is called upon to compare two LUT records from the current and previous versions it may use the offsets in the LUT records in question to lookup the corresponding entry in the corresponding directory maps and may only indicate a match if these referenced entities are the same (e.g., by full path name).

Figure 7:
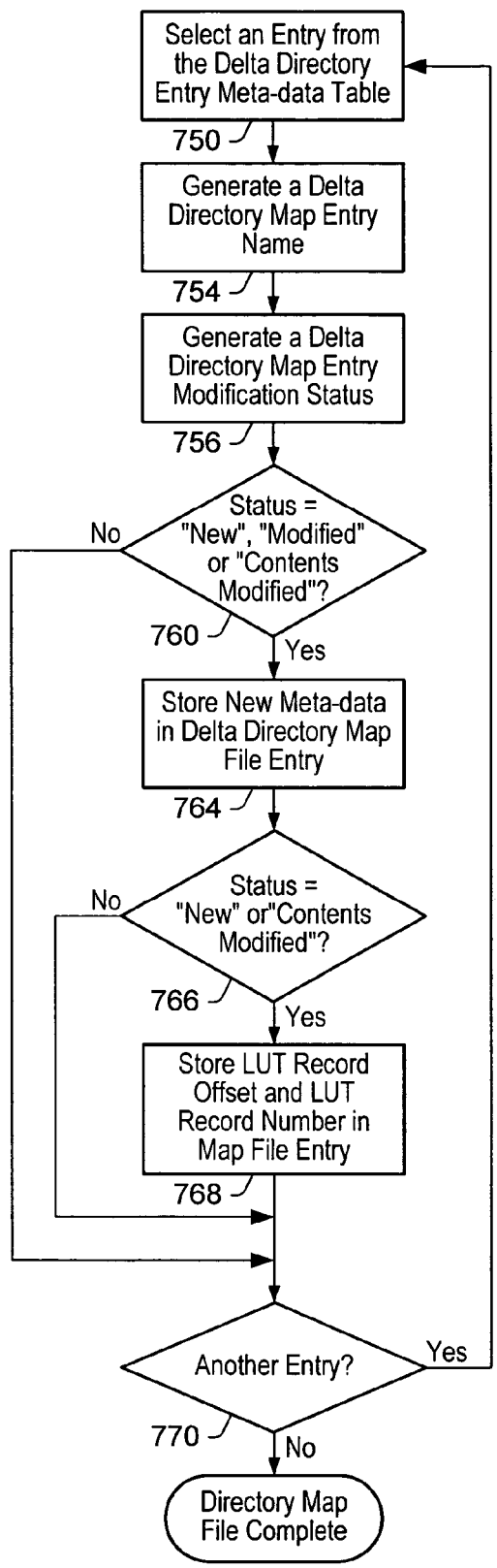
FIG. 7 is a flowchart of an exemplary process that generates a delta directory map file for the new version of the original file system from the delta directory entry meta-data table generated by the process shown in FIGS. 5 and 6 according to one embodiment.

FIG. 7 is a flowchart of an embodiment of a system and method for generating a delta directory map file for the new version of the original file system from the delta directory entry meta-data table generated by the process shown in FIGS. 5 and 6.

In 750, an entry in the delta directory entry meta-data table may be selected. An entry in the delta directory map file system may be generated, including the name of the entry (754) and a value for the modification status variable for the entry (756). In 760, it may be determined whether the newly generated entry's modification status variable has a value of "new", "modified", or "contents modified". If the modification status variable has a value of either "new", "modified", or "contents modified", the new meta-data may be stored in the delta directory map file for the entry (764) and processing may continue with 766. If the modification status variable has any other value, processing may proceed to 770.

In 766, it may be determined whether the newly generated entry's modification status variable has a value of "new" or "contents modified". If the modification status variable has a value of either "new" or "contents modified", the offset to the first LUT record for the file in the LUT file and the number of LUT records for the file in the LUT file may be stored in the delta directory map file (768) and processing may continue with 770. If the modification status variable has any other value, processing may proceed to 770.

In 770, it may be determined if another entry is to be processed. If another entry exists, processing may loop back to 750. If all entries in the delta directory entry meta-data table have been processed, the delta directory map file may be complete. The name of the new file system hierarchy, its version identifier, directory map file, LUT file, and modification data files may be compressed for delivery to a system having a copy of the original file system.

Figure 8:
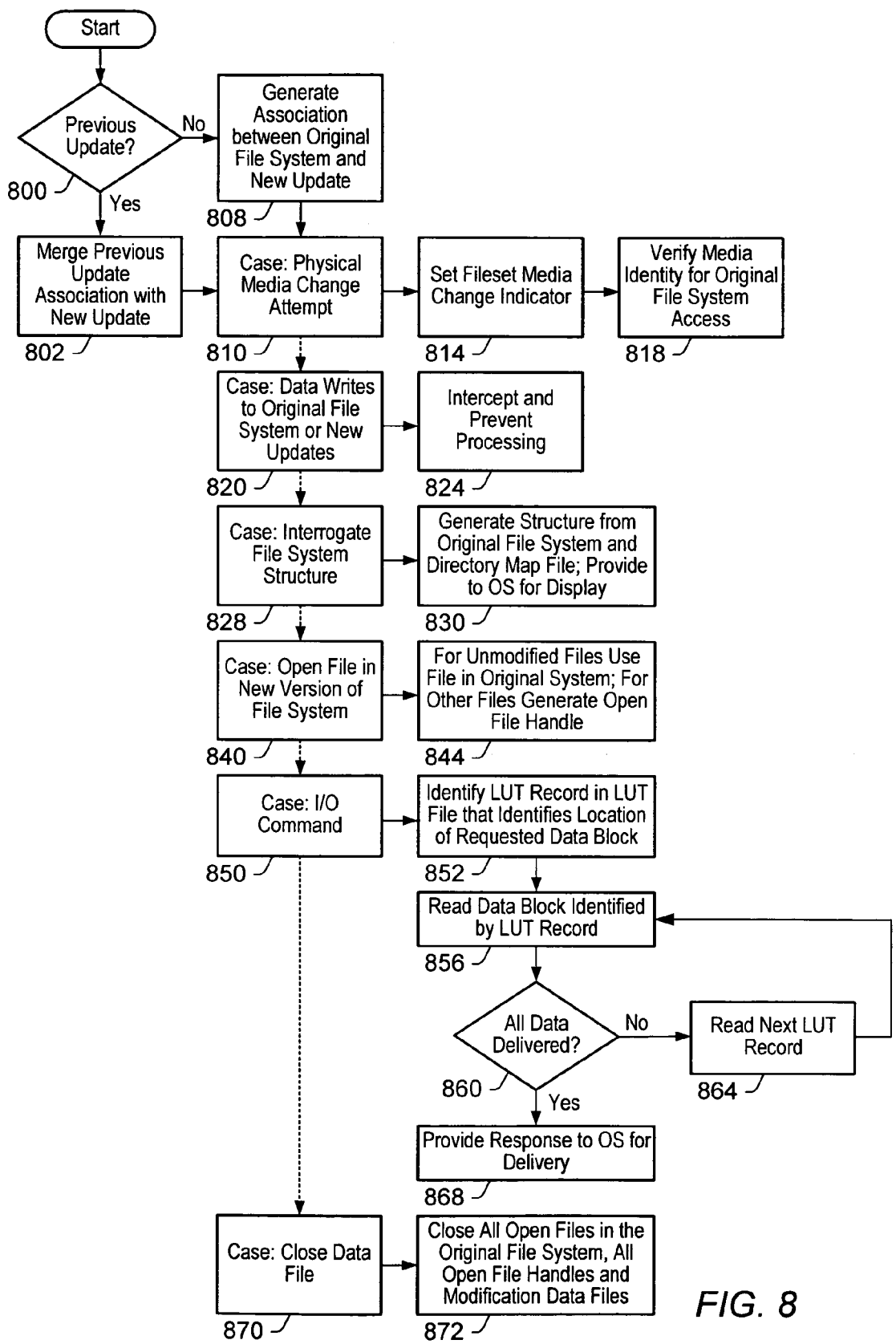
FIG. 8 is a flowchart of an exemplary process that uses the files for an update generated by the process shown in FIGS. 5, 6 and 7 to generate a latest version of the original file system according to one embodiment.

FIG. 8 is a flowchart of an exemplary process that uses the files for an update generated by the process shown in FIGS. 5, 6 and 7 to generate a latest version of the original file system according to one embodiment.

A compressed representation of the new version of the original file system may be transferred to a computer on which a copy of the original file system hierarchy is stored. Subsequently, the compressed representation of the new version of the original file system may be used to update the original file system. An application program may be provided as part of that representation to perform the process depicted in FIG. 8. In another embodiment, the application program may be part of the interface program provided for accessing the content of the original file system hierarchy such as an extension to the file system program of the recipient computer. The program may decompress the representation of the new file system hierarchy and store the delta directory map file, the LUT file, and the delta modification data block file in storage accessible to the computer. It is noted that any recursive compression of the LUT file may be decompressed to construct a LUT in non-recursive format.

In 800, it may be determined whether a directory containing a delta modification data block file for a previous version of the original file system hierarchy is associated with a directory or drive containing the original file system hierarchy. If there is an association with a directory containing a delta modification data block file, processing may continue with 802; otherwise, processing may continue with 808. Both 802 and 808 may be followed by 810.

In 802, the previous update association may be merged with an association between the directory where the decompressed files for the new file system hierarchy are stored and the drive or directory where the original file system hierarchy is stored. The merge replaces the existing associated delta directory map file and LUT file with the new delta directory map file and LUT file, but leaves any existing delta modification data block files referenced in the new LUT file.

In another embodiment, 802 may retain the existing associated delta directory map file and LUT file, for purposes of recalling a particular version of the file system at a particular point in time. If this alternative 802 were used, the user may be able to select which of a number of available versions of a file system hierarchy is accessed when the user attempts to access the original file system hierarchy. Such a selection mechanism may provide an accessible archive of multiple versions of the file system hierarchy.

In 808, an association may be created between the drive or directory where the original file system hierarchy may be stored and the directory where the downloaded decompressed files for the new version of the original file system hierarchy may be located.

The application program may be coupled to the operating system of the computer in which a copy of the original file system hierarchy and the decompressed files for the new version of the file system hierarchy may be stored. In a known manner, the operating system is modified to detect any attempted access to the drive or directory containing the original file system hierarchy or the files for the new version of the file system hierarchy. In 810, 820, 828, 840, 850 and 870, various attempted access operations to the drive or directory may contain the original file system hierarchy or the files for the new version of the file system hierarchy. Various responses to the attempted access operations may follow.

In 810, the attempted operation may be to change the physical media for the original file system hierarchy. The response to 810 may involve: in 814 the application program may store a media change indicator followed by a verification of the identity of the physical media when a subsequent attempt is made to access the original file system hierarchy in 818. If the physical media has changed, the application change program may check the media change indicator and determine whether the original file system media is available. If it is not, the program may indicate that the original file system hierarchy is not available for access by the user. Otherwise, the access may be processed.

In 820, the attempted operation may be to write data to the drive or directory containing the original file system hierarchy or the files for the new version of the original file system detected by the application program. The response to 820 may be 824 in which the write operation is intercepted and it is not processed.

In 828, the attempted operation may be an interrogation of the structure of the original file system hierarchy (e.g., a directory enumeration command). The response to 828 may involve building data in two passes and presenting that data to the user. In 830, the application program may retrieve the requested structure data from the original file system and delete the entries for which the value of the modification status variable in the delta directory map file is "deleted", "new", "modified", or "contents modified". The data for these entries may be obtained from the delta directory map file and used to modify the structure data responsive to the structure query. That is, the application program may obtain the data to be displayed for the original file system hierarchy, delete those files corresponding to delta directory map file entries having "deleted" as the value of the modification status variable, adding structure data for those entries in the directory map file having a status of "new", and modify the structure data for those entries in the directory map file having a status of "modified" or "contents modified". This data may be provided to the operating system for display to the user.

In 840, the attempted operation may be to open a file in the new version of the original file system hierarchy. The response to 840 is 844 in which the application program determines the value of the modification status variable for the file. If the modification status is "unmodified", the operation may be processed using the contents of the original file system only. Otherwise, the application program may construct and return an open file handle that identifies the file. The open file handle may identify the file for subsequent file operation commands but does not necessarily open any underlying file. For any file system operation command that interrogates the properties of a file for which an open file handle exists, the application program returns data from the delta directory map file entries that correspond to the file identified by the open file handle.

In 850, the attempted operation may be an I/O operation command that reads data from a file identified by an open file handle. The response to 850 may be 852 in which the application program identifies the LUT record in the LUT file that corresponds to the start of the requested data block. If the underlying file referenced in the LUT record is not opened, the application program may open the underlying file and associate it with the open file handle. The application program may read from the LUT record whether the data for the requested data block is to be read from the original file system hierarchy or one of the delta modification data block files. After the source file is identified, the offset data and data block length may be used to locate the first byte to be transferred from the identified source file and the number of bytes to be transferred, respectively. In 856, the corresponding number of bytes may be transferred from the source file to a response file being built. In 860, it may be determined whether all of the data has been delivered. If there is more data to be delivered, 864 may be processed; otherwise, 868 may be processed. In 864, the next LUT record may be read to extract data to be appended to the response file initially created in 856, followed by processing returning to 856. This process (i.e., 856, 860, and 864) may continue until the data transferred for an LUT record provides all of the data requested or until the last entry for the file is reached (i.e., in 860 it is determined that all of the data has been delivered). In 868, the response file built from the transfer of data from the source files identified by the LUT records may be provided to the operating system for delivery to the requesting program. In this manner, a response may be provided to a file system operation that appears to be the result of a single contiguous read operation.

In 870, the attempted operation may be to close a data file. The response to 870 may be 872 in which the application program closes all corresponding files in the original file system hierarchy and the data files for the new file system hierarchy.

FIGS. 3 through 8 describe an embodiment where the set of data objects may be a directory hierarchy of a file system and the data objects are files. It is noted that another embodiment may have the set of data objects represented by any structure of identified objects that contain data. For example, a directory services hierarchy representing objects used to manage a computer network may be another embodiment. Other similar examples would be obvious to those skilled in the art.

In one embodiment, a compact representation of the differences between an original version of a file system hierarchy and an updated version of the file system hierarchy may be generated. Multiple versions of the file system hierarchy may be maintained in multiple compact representations. This may allow for the regeneration of any updated version of the file system hierarchy from the original version of the file system hierarchy, by using one or more of the generated compact representations. It is noted that another use of the compact representations is to back up a file system hierarchy or to back up updates to a file system hierarchy to allow that version to be restored at a later date. Therefore, the sequence of generated compact representations may be used to restore any version of the file system hierarchy.

Figure 9:
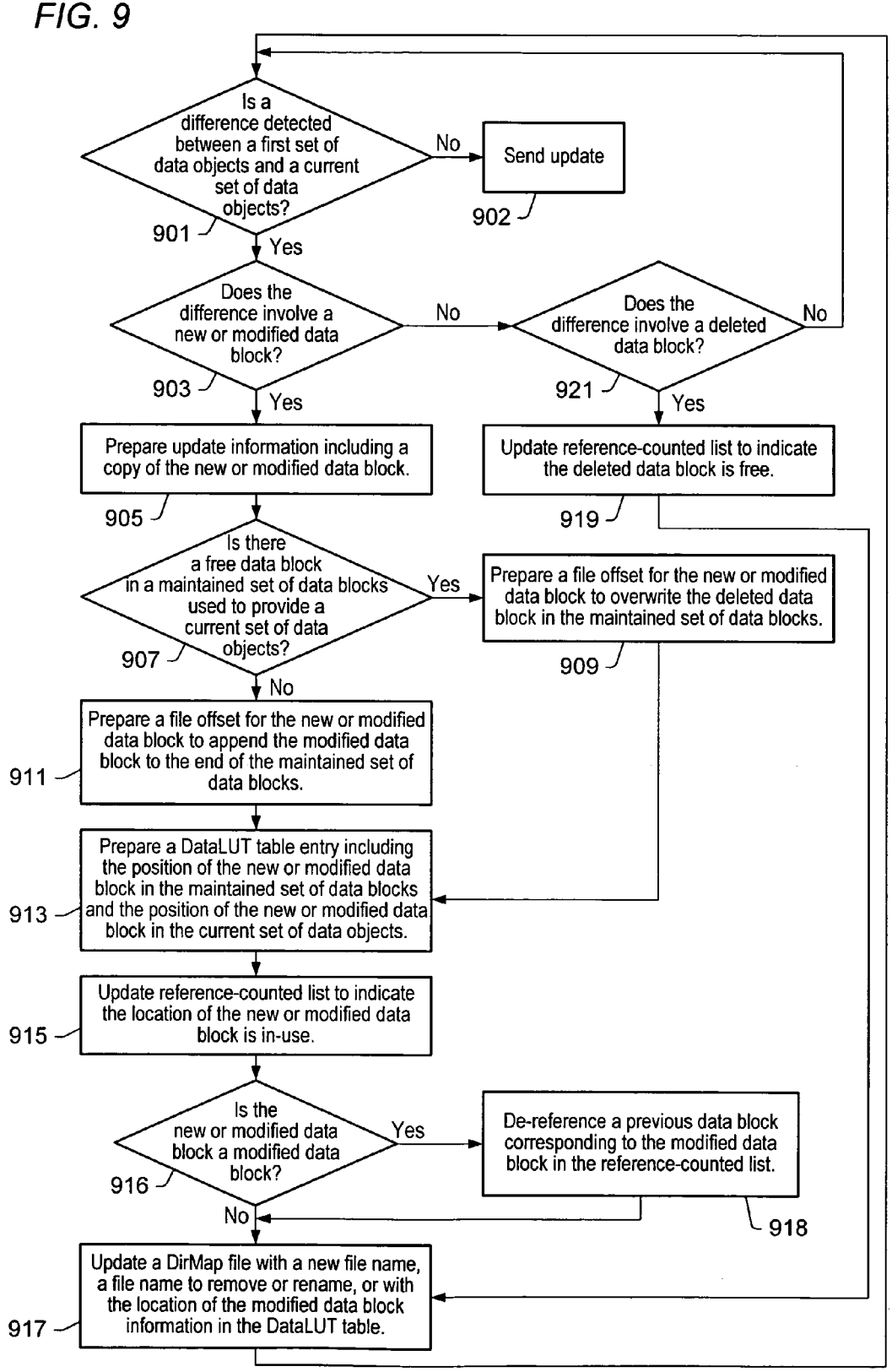
FIG. 9 is a flowchart for preparing an update in a first fit data blocks file management scheme according to one embodiment.

FIG. 9 is an embodiment of a flowchart for preparing an update in a first fit data blocks file management scheme. In one embodiment, a publisher may be included on a central computer system to distribute/update data on client computer systems coupled to the publisher. In one embodiment, the client computer system may be a personal digital assistant. In one embodiment, a file system may be virtually represented using a maintained set of data blocks and one or more reference files, such as but not limited to, the DataLUT file (e.g., the LUT file discussed above) and the DirMap file (e.g., the directory map file discussed above). In one embodiment, the maintained set of data blocks may be a smallest set of data blocks needed to represent the new file system. In one embodiment, the maintained set of data blocks may be stored on both the publisher and the client computer system. In one embodiment, the maintained set of data blocks may be stored on only the client computer system. Other storage locations for the maintained set of data blocks are also contemplated. Updates to the maintained set of data blocks may be created by the publisher by comparing a version of the data objects such as, but not limited to, a first set of data objects, to the current version of the data objects. The publisher may provide the client computer system with update packets containing data blocks, file offsets for the data blocks, and reference file addendums, such as but not limited to DataLUT entries and DirMap entries to apply to the copy of the maintained set of data blocks and reference files on the client computer system. The client computer system may provide a virtual version of the file system using the updated maintained set of data blocks and updated reference files. In one embodiment, the file offsets may be used to place the new or modified data blocks (i.e., a modification data block) in the maintained set of data blocks. It should be noted that in various embodiments of the methods described below, one or more of the processes described may be performed concurrently, in a different order than shown, or may be omitted entirely. Other additional processes may also be performed as desired.

In 901, a publisher may detect differences between a first set of data objects and a current set of data objects. In one embodiment, a baseline of the first set of data objects may be constructed and compared to the current set of data objects. Also, as discussed above, iterative checksums and safe checksums may be calculated for data blocks in the first set of data objects and compared to calculated iterative checksums and safe checksums of data blocks for the current set of data objects to find differences between them. For example, in one embodiment, differences between the first set of data objects and the current set of data objects may comprise new data blocks, modified data blocks, or deleted data blocks. If no more differences are detected, at 902, the publisher may send the detected differences in an update packet to the client computer system. If no differences were detected at all, the publisher may not send the update packet to the client computer system.

In 903, if a difference is detected, a publisher may determine if the detected difference involves a new data block or a modified data block. In 905, if the difference does involve a new data block or a modified data block, the update packet may be prepared to include a copy of a modification data block (e.g., the new data block or the modified data block). For example, if the current set of data objects has a new data block that is not found in the first set of data objects, the new data block may be included in the update packet. In another example, if a data block in the current set of data objects is a modified version of a data block in the first set of data objects, the modified data block may be included in the update packet.

In 907, the publisher may determine if there is a free data block in a maintained set of data blocks used to provide a current set of data objects. In one embodiment, a data block may be designated as a free data block in a reference counted list maintained on the publisher if the data block has been deleted and/or is no longer used. In one embodiment, the publisher may use the reference counted list (e.g., a file with a data block list) to identify "free" and "in-use" data blocks.

In 909, if there is a free data block in the maintained set of data blocks, a file offset for the new data block or the modified data block may be prepared to overwrite the free data block in the maintained set of data blocks. For example, the file offset may reference the position of the free data block.

In 911, if there is not a free data block in the maintained set of data blocks, a file offset may be prepared for the new data block or the modified data block to append the new data block or the modified data block to the end of the maintained set of data blocks. For example, the file offset may reference a position at the end of the maintained set of data blocks.

In 913, a DataLUT entry may be prepared to include the position of the new data block or modified data block in the maintained set of data blocks and the position of the new data block or modified data block in the new version of the file system. The DataLUT entry for the DataLUT file may be used to point to positions of the data blocks in the maintained set of data blocks used in the new version of the file system.

In 915, the reference counted list may be updated to indicate that the position of the new data block or the modified data block is "in use". In one embodiment, the publisher may use "free" and "in-use" designations in the reference counted list to indicate which data blocks in the maintained set of data blocks are still needed for the new version of the file system. Other designations are also contemplated. In one embodiment, data blocks that are no longer needed may be marked as free in the reference counted list.

In 921, if the difference did not involve a new data block or a modified data block at 903, the publisher may determine if the difference involves a deleted data block. If the difference did not involve a deleted data block, a new difference may be detected at 901.

In 919, if the difference did involve a deleted data block, the reference counted list may be updated to indicate the deleted data block position is "free". For example, future new or modified data blocks may be stored in the now free data block position (previously used by the now deleted data block).

In 916, if the new data block or modified data block is a modified data block, in 918, a previous data block corresponding to the modified data block may be de-referenced in the reference counted list to make the previous data block in the reference-counted list a "free" data block. If the new data block or modified data block is a new data block, processing may continue at 917. Other processes for modified data blocks are also contemplated.

In 917, the DirMap file may be updated with a new filename, a renamed filename, a filename to remove, or with the location of the new or modified data block information in the DataLUT file. In one embodiment, the DirMap file may provide a map of the file hierarchy of the file system. For example, if a new file is added to the first set of data objects (i.e., the current set of data objects has a file not in the first set of data objects) new data blocks with the new file's data may be sent in update packets along with a embodiment, a DirMap entry may also have pointers to data block information (such as, but not limited to, a position in the maintained set of data blocks and their size) in the DataLUT file. In one embodiment, the process may continue back at 901.

Figure 10:
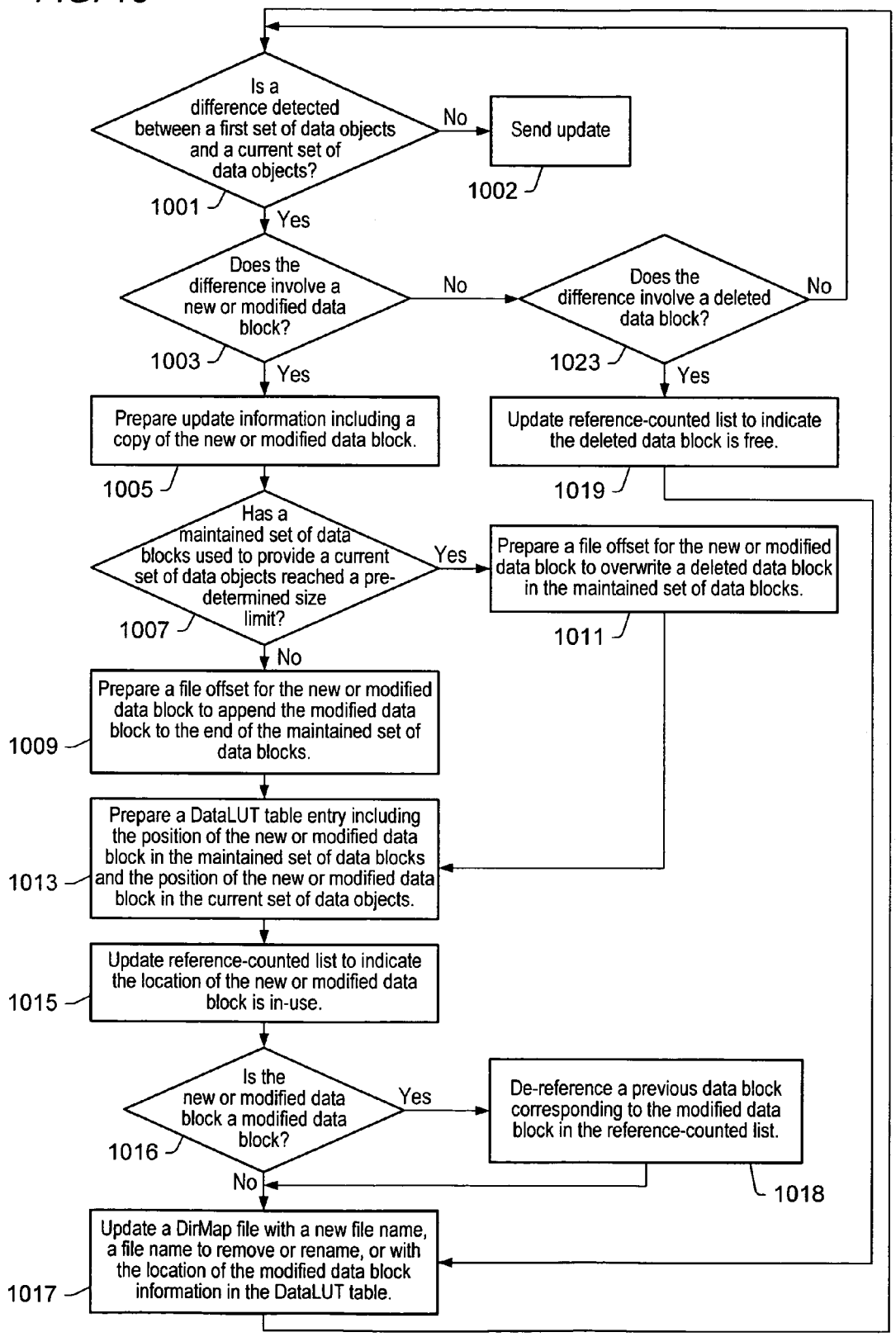
FIG. 10 is a flowchart for preparing an update in a least recently used data blocks file management scheme according to one embodiment.

FIG. 10 is an embodiment of a flowchart for preparing an update in a least recently used data blocks file management scheme. It should be noted that in various embodiments of the methods described below, one or more of the processes described may be performed concurrently, in a different order than shown, or may be omitted entirely. Other additional processes may also be performed as desired.

In 1001, a difference may be detected between a first set of data objects and a current set of data objects. If no additional differences are detected, at 1002, the publisher may send the detected differences in an update packet to the client computer system. If no differences were detected at all, the publisher may not send the update packet to the client computer system.

In 1003, the publisher may determine if the difference involves a new data block or a modified data block.

In 1005, if the difference involves a new data block or a modified data block, update information may be prepared to include a copy of the new data block or modified data block.

In 1007, the publisher may determine if a maintained set of data blocks used to provide a current set of data objects has reached a pre-determined size limit. In one embodiment, data blocks may not be overwritten until the maintained set of data blocks has reached a pre-determined size limit. For example, the pre-determined size limit may be the size of a storage medium used by the client computer system. Other predetermined size limits are also contemplated. In one embodiment, the publisher may fill the maintained set of data blocks to the pre-determined size limit first to keep copies of data blocks no longer referenced by the DataLUT file or needed to create the new file system in case these data blocks become needed again.

In 1009, if the maintained set of data blocks has not reached the pre-determined size limit, a file offset may be prepared for the new data block or the modified data block to append the modified data block to the end of the maintained set of data blocks.

In 1011, if the maintained set of data blocks has reached the pre-determined size limit, a file offset may be prepared for the new data block or modified data block to overwrite a deleted data block in the maintained set of data blocks.

In 1013, a DataLUT entry including the position of the new data block or the modified data block in the maintained set of data blocks and the position of the new data block or the modified data block in the current set of data objects may be created. As discussed above, the DataLUT entry may assist in referencing data blocks used in the new version of the file system.

In 1015, the reference counted list may be updated to indicate the position of the new data block or the modified data block is "in use". For example, the position now occupied by the new or modified data block may be reserved for the new or modified data block so that the new or modified data block is not overwritten until it is deleted in future updates.

In 1023, if the difference at 1103 did not involve a new data block or a modified data block, the publisher may determine if the difference involves a deleted data block. If the difference did not involve a deleted data block, a new difference may be detected at 1101.

In 1019, if the difference did involve a deleted data block, the reference counted list may be updated to indicate the deleted data block position is "free".

In 1016, if the new data block or modified data block is a modified data block, in 1018, a previous data block corresponding to the modified data block may be de-referenced in the reference counted list to make the previous data block in the reference-counted list a "free" data block. If the new data block or modified data block is a new data block, processing may continue at 1017. Other processes for modified data blocks are also contemplated.

In 1017, a DirMap file may be updated with a new filename, a renamed filename, a filename to be removed, or with the location of the new data block or the modified data block information in the DataLUT file. In one embodiment, the process may continue at 1001.

Figure 11:
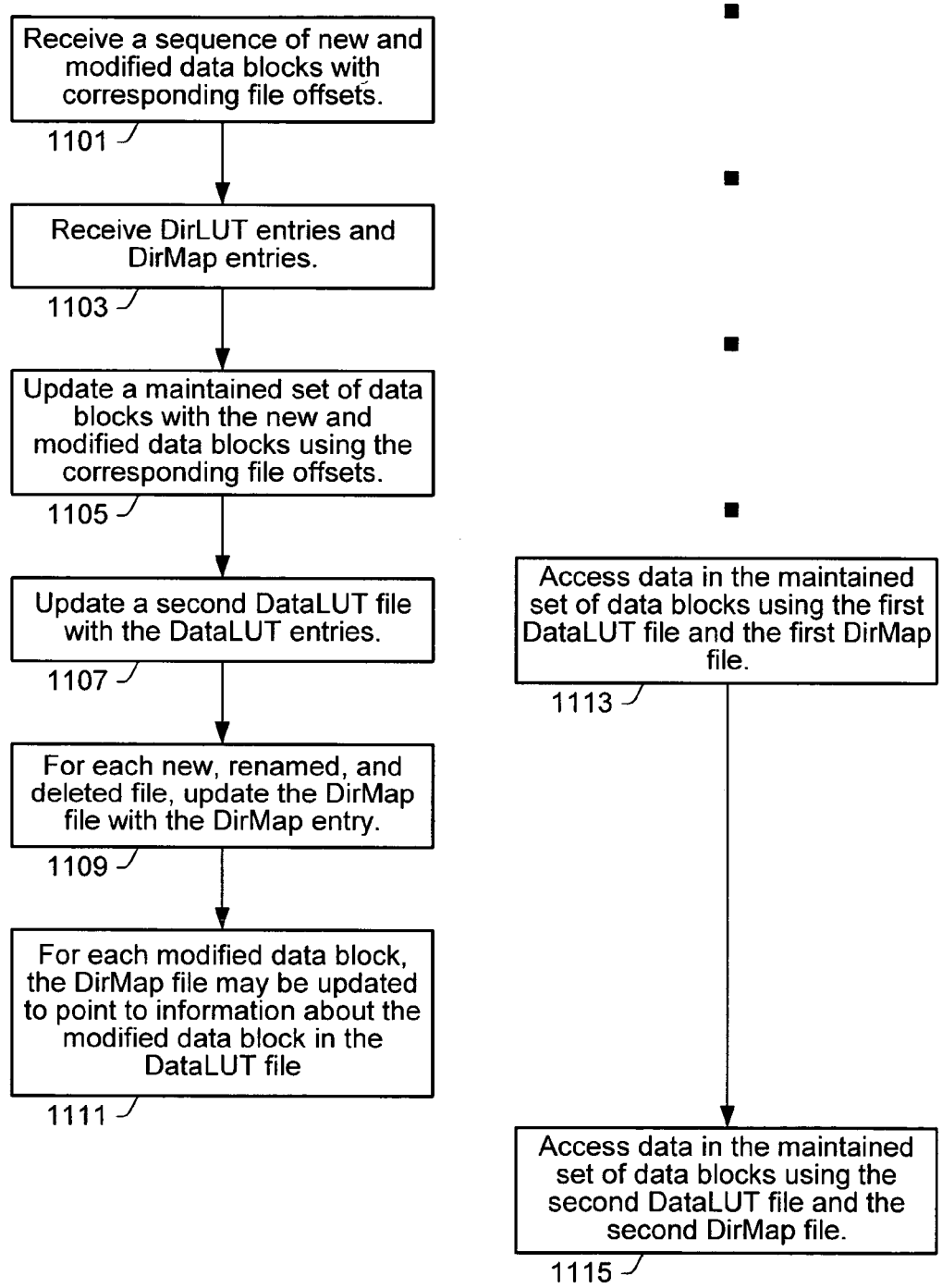
FIG. 11 is a flowchart for updating a client according to one embodiment.

FIG. 11 is an embodiment of a flowchart for updating a client. It should be noted that in various embodiments of the methods described below, one or more of the processes described may be performed concurrently, in a different order than shown, or may be omitted entirely. Other additional processes may also be performed as desired.

In 1101, a sequence of new data blocks and/or modified data blocks may be received with corresponding file offsets. In one embodiment, the file offsets may be used to put the new data block or modified data block in the maintained set of data blocks.

In 1103, DirLUT entries and DirMap entries may be received. In one embodiment, other reference files may be used. In another embodiment, no reference files may be used.

In 1105, a maintained set of data blocks may be updated with the new data blocks and modified data blocks using the corresponding file offsets. For example, deleted data blocks may be overwritten with new data blocks or modified data blocks. In addition, data blocks may be appended onto the end of the maintained set of data blocks.

In 1107, a second DataLUT file may be updated with the DataLUT entries. In one embodiment, the DataLUT file may have DataLUT entries appended onto the end of the DataLUT file. In one embodiment, recursive entries in the DataLUT file may be consolidated into one entry in the DataLUT file. The DataLUT file may reference data blocks in the maintained set of data blocks needed for corresponding files in the new file system.

In 1109, for each new, renamed, and deleted file, the DirMap file may be updated with the DirMap entry. The DirMap file may provide a file hierarchy for the file system. In one embodiment, the DirMap file may not be used.

In 1111, for each modified data block, the DirMap file may be updated to point to information about the modified data block in the DataLUT file.

In 1113, data may be accessed in the maintained set of data blocks using the first DataLUT file and the first DirMap file at substantially the same time as the second DataLUT file is updated with the DataLUT entries at 1107.

In 1115, after the second DataLUT file is updated with the DataLUT entries, the data in the maintained set of data blocks may be accessed using the second DataLUT file and the second DirMap file. In one embodiment, the client computer system may use only one version of the DataLUT file and DirMap file.

Figure 12:
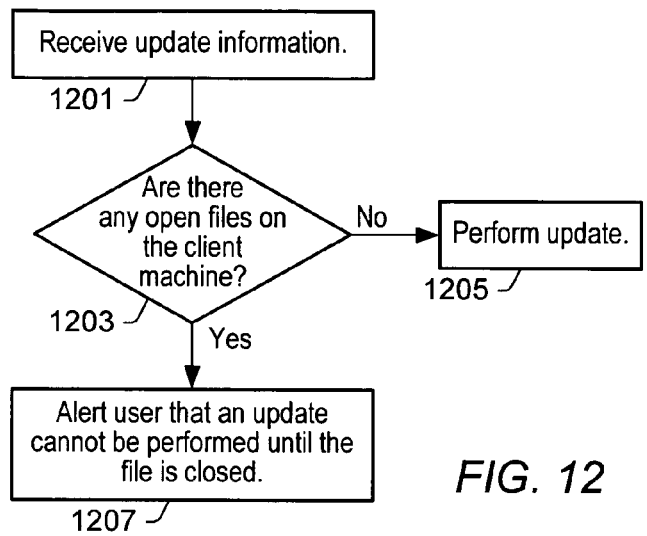
FIG. 12 is a flowchart for managing open files during an update according to one embodiment.

FIG. 12 is an embodiment of a flowchart for managing open files during an update. It should be noted that in various embodiments of the methods described below, one or more of the processes described may be performed concurrently, in a different order than shown, or may be omitted entirely. Other additional processes may also be performed as desired.

In 1201, update information may be received. For example, update information may include data blocks, file offsets, DataLUT entries, and/or DirMap entries. Other update information is also contemplated.

In 1203, software executing on the client computer system may determine if there are any open files on the client machine. For example, a user of the client computer system may be accessing a file in the file system. In one embodiment, the DataLUT file and/or DirMap file may be open.

In 1205, if there are no open files on the client machine, an update may be performed.

In 1207, if there are open files on the client machine, a user may be alerted that an update cannot be performed until the open files are closed. In one embodiment, the client computer system may indicate which open file needs to be closed. In one embodiment, the maintained set of data blocks may be updated before the user has a chance to open a file.

Figure 13:
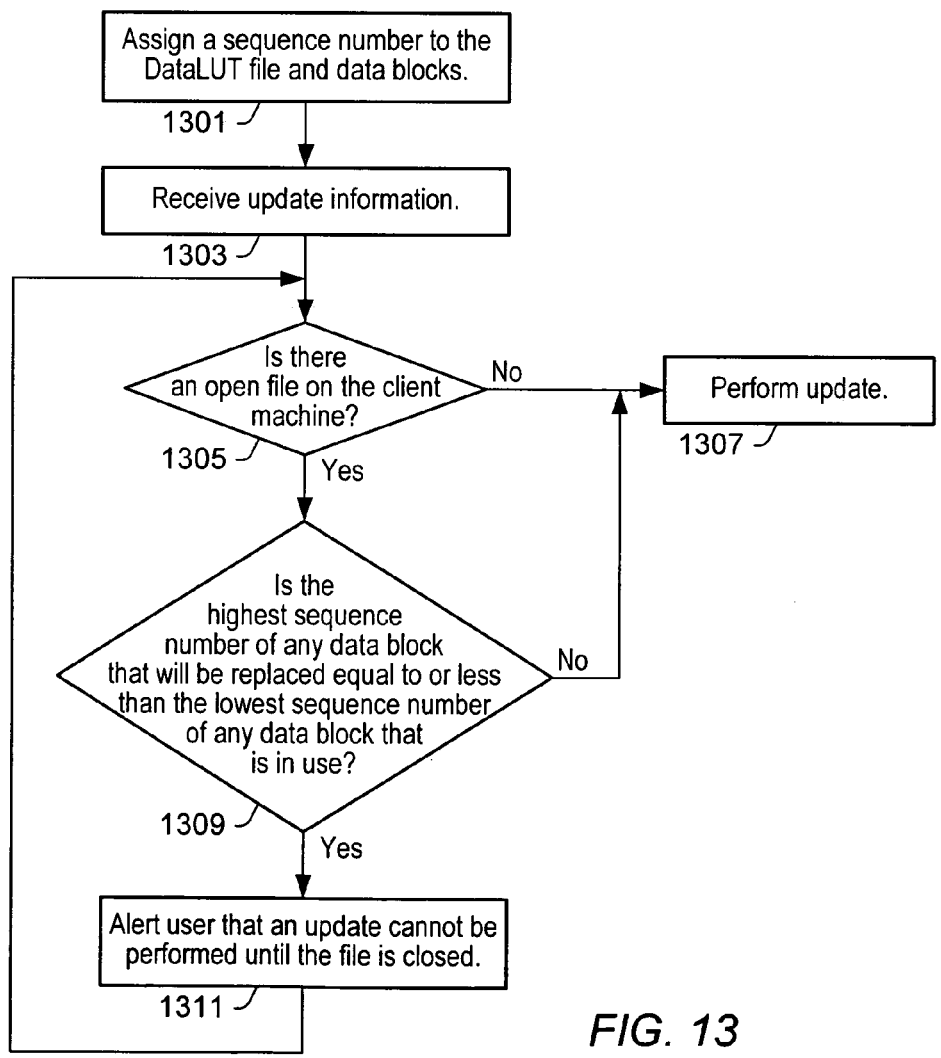
FIG. 13 is a flowchart for using sequence numbers to manage open files during an update according to one embodiment.

FIG. 13 is an embodiment of a flowchart for using sequence numbers to manage open files during an update. It should be noted that in various embodiments of the methods described below, one or more of the processes described may be performed concurrently, in a different order than shown, or may be omitted entirely. Other additional processes may also be performed as desired.

In 1301, an update sequence number may be assigned to the DataLUT file and data blocks sent in the update packet. For example, each new or modified data block will receive the update sequence number. Other data blocks that are reused (i.e., not modified or deleted) will keep the update sequence number assigned to them when they were first added. An original set of data blocks may have the lowest sequence number. In one embodiment, the least recently used management scheme may be used (i.e., only reusing free blocks if the maintained set of data blocks has reached a pre-determined limit).

In 1303, update information may be received by the client computer system.

In 1305, the client computer system may determine if there is an open file on the client machine.

In 1307, if there is not an open file on the client computer system, an update may be performed.

In 1309, the client computer system may determine if the highest sequence number of any data block that will be replaced is equal to or less than the lowest sequence number of any data block that is in use for an open file.

In 1311, if the highest sequence number of any data block that will be replaced is equal to or less than the lowest sequence number of any data block that is in use for an open file, a user may be alerted that an update cannot be performed until the file is closed.

Figures 14, 15:
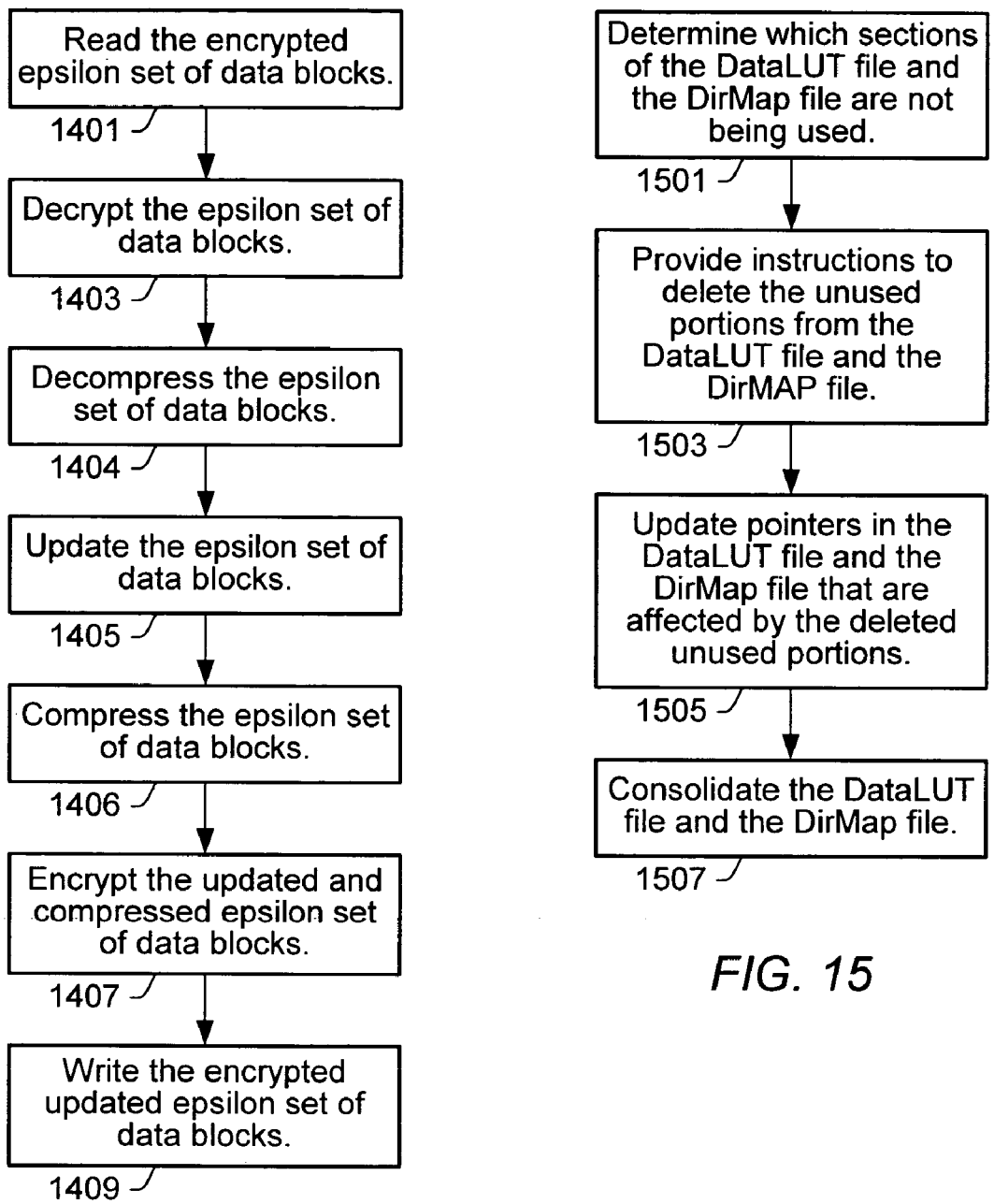
FIG. 14 is a flowchart for encrypting an updated data blocks file according to one embodiment.
FIG. 15 is a flowchart for reorganizing references files according to one embodiment.

FIG. 14 is an embodiment of a flowchart for encrypting an updated data blocks file. It should be noted that in various embodiments of the methods described below, one or more of the processes described may be performed concurrently, in a different order than shown, or may be omitted entirely. Other additional processes may also be performed as desired.

In 1401, an encrypted maintained set of data blocks may be read. In one embodiment, the maintained set of data blocks may be encrypted on the client computer system. In one embodiment, the update packets sent to the client computer system may be encrypted.

In 1403, the maintained set of data blocks may be decrypted. In one embodiment, public key and/or symmetric key encryption schemes may be used. Other encryption schemes are also contemplated.

In 1404, the maintained set of data blocks may be decompressed. In one embodiment, the maintained set of data blocks may not need to be decompressed.

In 1405, the maintained set of data blocks may be updated. For example, the update packet may include a new data block with a corresponding file offset, a DataLUT entry, and a DirMap entry. The maintained set of data blocks may be updated with the update packet.

In 1406, the updated maintained set of data blocks may be compressed.

In 1407, the updated maintained set of data blocks may be encrypted. In one embodiment, the updated maintained set of data blocks may not be compressed prior to encryption.

In 1409, the encrypted updated maintained set of data blocks may be written. For example, the encrypted updated maintained set of data blocks may be written to a storage medium such as, but not limited to, a hard disk.

FIG. 15 is an embodiment of a flowchart for reorganizing references files. It should be noted that in various embodiments of the methods described below, one or more of the processes described may be performed concurrently, in a different order than shown, or may be omitted entirely. Other additional processes may also be performed as desired.

In 1501, the publisher may determine which sections of the DataLUT file and the DirMap file are not being used. In one embodiment, the client computer system may determine which sections of the DataLUT file and the DirMap file are not being used.

In 1503, instructions may be provided to delete the unused portions from the DataLUT file and the DirMap file. In one embodiment, the publisher may provide instructions for deleting unused portions of the DataLUT file and the DirMap file.

In 1505, pointers in the DataLUT file and the DirMap file that are affected by the deleted unused portions may be updated. For example, pointers in the DataLUT file and the DirMap file may point to data blocks in the maintained set of data blocks.

In 1507, the DataLUT file and the DirMap file may be consolidated. For example, in recursive entries in the DataLUT file and DirMap files, an unneeded entry in a chain of entries (each entry referring to the previous entry) may no longer be used.

Various embodiments may further include receiving or storing instructions and/or information implemented in accordance with the foregoing description upon a carrier medium. Suitable carrier media may include storage media or memory media such as magnetic or optical media, e.g., disk or CD-ROM, as well as transmission media or signals such as electrical, electromagnetic, or digital signals, conveyed via a communication medium such as a network and/or a wireless link Further modifications and alternative embodiments of various aspects of the invention may be apparent to those skilled in the art in view of this description.

Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A method, comprising:
providing a first set of data objects comprising one or more first data blocks;
providing at least one modification data block, wherein the at least one modification data block comprises a new data block not present in the first set of data objects or a modified version of a data block in the first set of data objects; and
providing at least one file offset for the at least one modification data block, wherein the file offset references a position in a maintained set of data blocks to place the at least one modification data block,
wherein the maintained set of data blocks and the at least one file offset is used to provide a current set of data objects;
wherein if the maintained set of data blocks includes at least one free data block, at least one file offset is a position in the maintained set of data blocks to overwrite at least one free data block with the at least one modification data block.

2. The method of claim 1, further comprising:
providing update information comprising the at least one modification data block and the at least one file offset corresponding to the at least one modification data block,
wherein the update information is used to update the maintained set of data blocks to provide a user with the current set of data objects.

3. The method of claim 1, wherein the at least one modification data block comprises a difference between the first set of data objects and the current set of data objects.

4. The method of claim 1, wherein if the maintained set of data blocks does not include at least one free data block, the at least one file offset is a position in the maintained set of data blocks to append the at least one modification data block to an end of the maintained set of data blocks.

5. The method of claim 1, further comprising:
providing a reference counted list comprising a status of at least one data block in the maintained set of data blocks, wherein the status indicates whether the at least one data block is free or in-use.

6. The method of claim 5, further comprising:
changing the status of at least one free data block to in-use if at least one file offset indicates that at least one modification data block should overwrite at least one free data block.

7. The method of claim 5, further comprising:
modifying the reference counted list to indicate that the at least one modification data block is appended to an end of the maintained set of data blocks if the maintained set of data objects does not include at least one free data block.

8. The method of claim 5, further comprising:
modifying the status of at least one deleted data block of the first set of data objects to indicate that the at least one deleted data block is free, wherein the at least one deleted data block comprises a data block present in the first set of data objects but not present in the current set of data objects.

9. The method of claim 1, further comprising:
maintaining a lookup table comprising a position of at least one data block of the maintained set of data blocks and a corresponding position of the at least one data block in the current set of data objects, wherein the maintained set of data blocks and the lookup table may be used to represent the current set of data objects.

10. The method of claim 9, further comprising:
preparing an entry for the lookup table including a position of at least one modification data block in the maintained set of data blocks and a position of at least one modification data block in the current set of data objects.

11. The method of claim 1, further comprising:
maintaining a directory map file identifying at least one filename in the current set of data objects.

12. The method of claim 1, further comprising:
maintaining a directory map file identifying at least one directory in the current set of data objects and identifying at least one file in the at least one directory.

13. A method, comprising:
providing at least one modification data block, wherein the at least one modification data block comprises a data block included in a current set of data objects but not included in a first set of data objects or a data block in the current set of data objects that is a modified version of a data block from the first set of data objects;
updating a maintained set of data blocks with the at least one modification data block;
maintaining a directory map file comprising a listing of directories in the current set of data objects and a listing of files in the directories; and
updating the directory map file with a new filename of a filename not in the first set of data objects but in the current set of data objects or removing a deleted filename of a filename in the first set of data objects but not in the current set of data objects.

14. The method of claim 13, wherein updating the maintained set of data blocks comprises placing the at least one modification data block in a position in the maintained set of data blocks indicated by at least one file offset.

15. The method of claim 13, further comprising maintaining a lookup table file, wherein the lookup table file comprises a position of data blocks in the maintained set of data blocks and a corresponding position for the data blocks in the current set of data objects.

16. The method of claim 13, further comprising:
providing a lookup table entry corresponding to at least one data block, wherein the lookup table entry comprises a position of the at least one modification data block in the maintained set of data blocks and a position of the at least one modification data block in the current set of data objects; and
updating the lookup table with the lookup table entry.

17. The method of claim 13,
wherein the directory map file comprises a listing of filenames in the current set of data objects.

18. The method of claim 13,
wherein the directory map file is a first directory map file; the method further comprising:
providing a second directory map file, wherein the second directory map file comprises a listing of at least one directory in the current set of data objects and a listing of at least one file in the at least one directory;
providing a first directory map update for the at least one modification data block, wherein the first directory map update comprises a new filename or a deleted filename; and updating the first directory map file with the first directory map update, wherein at least part of the updating the first directory map file is performed substantially simultaneously with the second directory map file being used to reference the maintained set of data blocks.

19. The method of claim 18, further comprising:
using the first directory map file to reference the maintained set of data blocks after the updating the first directory map file.

20. The method of claim 13, wherein the maintained set of data blocks is an active in situ set of data blocks.

21. A method, comprising:
providing at least one modification data block, wherein the at least one modification data block comprises a data block included in a current set of data objects but not included in a first set of data objects or a data block in the current set of data objects that is a modified version of a data block from the first set of data objects;
updating a maintained set of data blocks with the at least one modification data block;
providing a first lookup table file and a second lookup table file; wherein the first lookup table file and the second lookup table file comprise a position of data blocks in the maintained set of data blocks and a corresponding position for the data blocks in the current set of data objects;
providing a first lookup table entry for the at least one modification data block, wherein the first lookup table entry comprises a position of the at least one modification data block in the maintained set of data blocks and a position of the at least one modification data block in the current set of data objects; and
updating the first lookup table file with the first lookup table entry, wherein at least part of said updating is performed substantially simultaneously with the second lookup table being used to reference the maintained set of data blocks.

22. The method of claim 21, further comprising:
using the first lookup table file to reference the maintained set of data blocks after the updating of the first lookup table file.

23. A computer readable storage medium comprising program instructions, wherein the program instructions are computer-executable to:
provide a first set of data objects comprising one or more first data blocks;
provide at least one modification data block, wherein the at least one modification data block comprises a new data block not present in the first set of data objects or a modified version of a data block in the first set of data objects; and
provide at least one file offset for the at least one modification data block, wherein the at least one file offset references a position in a maintained set of data blocks to place the at least one modification data block,
wherein the maintained set of data blocks and the at least one file offset is used to provide a current set of data objects;
wherein if the maintained set of data blocks includes at least one free data block, at least one file offset is a position in the maintained set of data blocks to overwrite at least one free data block with the at least one modification data block.

24. The computer readable storage medium of claim 23, wherein the program instructions are further computer-executable to:
provide update information comprising the at least one modification data block and the at least one file offset corresponding to the at least one modification data block,
wherein the update information is used to update the maintained set of data blocks to provide a user with the current set of data objects.

25. The computer readable storage medium of claim 23, wherein the at least one modification data block comprises a difference between the first set of data objects and the current set of data objects.

26. The computer readable storage medium of claim 23, wherein if the maintained set of data blocks does not include at least one free data block, the at least one file offset is a position in the maintained set of data blocks to append the at least one modification data block to an end of the maintained set of data blocks.

27. The computer readable storage medium of claim 23, wherein the program instructions are further computer-executable to:
provide a reference counted list comprising a status of at least one data block in the maintained set of data blocks, wherein the status indicates whether the at least one data block is free or in-use.

28. The computer readable storage medium of claim 27, wherein the program instructions are further computer-executable to:
change the status of at least one free data block to in-use if at least one file offset indicates that at least one modification data block should overwrite at least one free data block.

29. The computer readable storage medium of claim 27, wherein the program instructions are further computer-executable to:
modify the reference counted list to indicate that the at least one modification data block is appended to an end of the maintained set of data blocks if the maintained set of data objects does not include at least one free data block.

30. The computer readable storage medium of claim 27, wherein the program instructions are further computer-executable to:
modify the status of at least one deleted data block of the first set of data objects to indicate that the at least one deleted data block is free, wherein the at least one deleted data block comprises a data block present in the first set of data objects but not present in the current set of data objects.

31. The computer readable storage medium of claim 23, wherein the program instructions are further computer-executable to:
maintain a lookup table comprising a position of at least one data block of the maintained set of data blocks and a corresponding position of the at least one data block in the current set of data objects, wherein the maintained set of data blocks and the lookup table may be used to represent the current set of data objects.

32. The computer readable storage medium of claim 31, wherein the program instructions are further computer-executable to:
prepare an entry for the lookup table including a position of at least one modification data block in the maintained set of data blocks and a position of at least one modification data block in the current set of data objects.

33. The computer readable storage medium of claim 23, wherein the program instructions are further computer-executable to:

maintain a directory map file identifying at least one filename in the current set of data objects.

34. The computer readable storage medium of claim 23, wherein the program instructions are further computer-executable to:

maintain a directory map file identifying at least one directory in the current set of data objects and identifying at least one file in the at least one directory.

35. A computer readable storage medium comprising program instructions, wherein the program instructions are computer-executable to:

provide at least one modification data block, wherein the at least one modification data block comprises a data block included in a current set of data objects but not included in a first set of data objects or a data block in the current set of data objects that is a modified version of a data block from the first set of data objects;

update a maintained set of data blocks with the at least one modification data block;

maintain a directory map file comprising a listing of directories in the current set of data objects and a listing of files in the directories; and update the directory map file with a new filename of a filename not in the first set of data objects but in the current set of data objects or removing a deleted filename of a filename in the first set of data objects but not in the current set of data objects.

36. The computer readable storage medium of claim 35, wherein updating the maintained set of data blocks comprises placing the at least one modification data block in a position in the maintained set of data blocks indicated by at least one file offset.

37. The computer readable storage medium of claim 35, wherein the program instructions are further computer-executable to:

maintain a lookup table file, wherein the lookup table file comprises a position of data blocks in the maintained set of data blocks and a corresponding position for the data blocks in the current set of data objects.

38. The computer readable storage medium of claim 35, wherein the program instructions are further computer-executable to:

provide a lookup table entry corresponding to at least one data block, wherein the lookup table entry comprises a position of the at least one modification data block in the maintained set of data blocks and a position of the at least one modification data block in the current set of data objects; and update the lookup table with the lookup table entry.

39. The computer readable storage medium of claim 35, wherein the directory map file comprises a listing of filenames in the current set of data objects.

40. The computer readable storage medium of claim 35, wherein the program instructions are further computer-executable to:

provide a first lookup table file and a second lookup table file; wherein the first lookup table file and the second lookup table file comprise a position of data blocks in the maintained set of data blocks and a corresponding position for the data blocks in the current set of data objects;

provide a first lookup table entry for the at least one modification data block, wherein the first lookup table entry comprises a position of the at least one modification data block in the maintained set of data blocks and a position of the at least one modification data block in the current set of data objects; and update the first lookup table file with the first lookup table entry, wherein at least part of said updating is performed substantially simultaneously with the second lookup table file being used to reference the maintained set of data blocks.

41. The computer readable storage medium of claim 40, wherein the program instructions are further computer-executable to:

use the first lookup table file to reference the maintained set of data blocks after the updating of the first lookup table file.

42. The computer readable storage medium of claim 35, wherein the directory map file is a first directory map file; wherein the program instructions are further computer-executable to:

provide a second directory map file, wherein the second directory map file comprises a listing of at least one directory in the current set of data objects and a listing of at least one file in the at least one directory;

provide a first directory map update for the at least one modification data block, wherein the first directory map update comprises a new filename or a deleted filename; and update the first directory map file with the first directory map update, wherein at least part of the updating the first directory map file is performed substantially simultaneously with the second directory map file being used to reference the maintained set of data blocks.

43. The computer readable storage medium of claim 42, wherein the program instructions are further computer-executable to:

use the first directory map file to reference the maintained set of data blocks after the updating the first directory map file.

44. A system comprising:

a CPU in communication with a network;

a memory coupled to the CPU, wherein the memory comprises program instructions executable to:

provide a first set of data objects comprising one or more first data blocks;

provide at least one modification data block, wherein the at least one modification data block comprises a new data block not present in the first set of data objects or a modified version of a data block in the first set of data objects; and provide at least one file offset for the at least one modification data block, wherein the file offset references a position in a maintained set of data blocks to place the at least one modification data block, wherein the maintained set of data blocks and the at least one file offset is used to provide a current set of data objects;

wherein if the maintained set of data blocks includes at least one free data block, at least one file offset is a position in the maintained set of data blocks to overwrite at least one free data block with the at least one modification data block.

45. The system of claim 44, wherein the program instructions are further executable to:

provide update information comprising the at least one modification data block and the at least one file offset corresponding to the at least one modification data block, wherein the update information is used to update the maintained set of data blocks to provide a user with the current set of data objects.

46. The system of claim 44, wherein the at least one modification data block comprises a difference between the first set of data objects and the current set of data objects.

47. The system of claim 44, wherein if the maintained set of data blocks does not include at least one free data block, the at least one file offset is a position in the maintained set of data blocks to append the at least one modification data block to an end of the maintained set of data blocks.

48. The system of claim 44, wherein the program instructions are further executable to:
provide a reference counted list comprising a status of at least one data block in the maintained set of data blocks, wherein the status indicates whether the at least one data block is free or in-use.

49. The system of claim 48, wherein the program instructions are further executable to:
change the status of at least one free data block to in-use if at least one file offset indicates that at least one modification data block should overwrite at least one free data block.

50. The system of claim 48, wherein the program instructions are further executable to:
modify the reference counted list to indicate that the at least one modification data block is appended to an end of the maintained set of data blocks if the maintained set of data objects does not include at least one free data block.

51. The system of claim 48, wherein the program instructions are further executable to:
modify the status of at least one deleted data block of the first set of data objects to indicate that the at least one deleted data block is free, wherein the at least one deleted data block comprises a data block present in the first set of data objects but not present in the current set of data objects.

52. The system of claim 44, wherein the program instructions are further executable to:
maintain a lookup table comprising a position of at least one data block of the maintained set of data blocks and a corresponding position of the at least one data block in the current set of data objects, wherein the maintained set of data blocks and the lookup table may be used to represent the current set of data objects.

53. The system of claim 52, wherein the program instructions are further executable to:
prepare an entry for the lookup table including the position of at least one modification data block in the maintained set of data blocks and the position of at least one modification data block in the current set of data objects.

54. The system of claim 44, wherein the program instructions are further executable to:
maintain a directory map file identifying at least one filename in the current set of data objects.

55. The system of claim 44, wherein the program instructions are further executable to:
maintain a directory map file identifying at least one directory in the current set of data objects and identifying at least one file in the at least one directory.

56. A system comprising:
a CPU in communication with a network;
a memory coupled to the CPU, wherein the memory comprises program instructions executable to:
provide at least one modification data block, wherein the at least one modification data block comprises a data block included in a current set of data objects but not included in a first set of data objects or a data block in the current set of data objects that is a modified version of a data block from the first set of data objects;
update a maintained set of data blocks with the at least one modification data block;
maintain a directory map file comprising a listing of directories in the current set of data objects and a listing of files in the directories; and
update the directory map file with a new filename of a filename not in the first set of data objects but in the current set of data objects or removing a deleted filename of a filename in the first set of data objects but not in the current set of data objects.

57. The system of claim 56, wherein updating the maintained set of data blocks comprises placing the at least one modification data block in a position in the maintained set of data blocks indicated by at least one file offset.

58. The system of claim 56, wherein the program instructions are further executable to:
maintain a lookup table file, wherein the lookup table file comprises a position of data blocks in the maintained set of data blocks and a corresponding position for the data blocks in the current set of data objects.

59. The system of claim 56, wherein the program instructions are further executable to:
provide a lookup table entry corresponding to at least one data block, wherein the lookup table entry comprises the position of the at least one modification data block in the maintained set of data blocks and the position of the at least one modification data block in the current set of data objects; and
update the lookup table with the lookup table entry.

60. The system of claim 56,
wherein the directory map file comprises a listing of filenames in the current set of data objects.

61. The system of claim 56, wherein the program instructions are further executable to:
provide a first lookup table file and a second lookup table file; wherein the first lookup table file and the second lookup table file comprise a position of data blocks in the maintained set of data blocks and a corresponding position for the data blocks in the current set of data objects;
provide a first lookup table entry for the at least one modification data block, wherein the first lookup table entry comprises a position of the at least one modification data block in the maintained set of data blocks and a position of the at least one modification data block in the current set of data objects; and
update the first lookup table file with the first lookup table entry, wherein at least part of said updating is performed substantially simultaneously with the second lookup table being used to reference the maintained set of data blocks.

62. The system of claim 61, wherein the program instructions are further executable to:
use the first lookup table file to reference the maintained set of data blocks after the updating of the first lookup table file.

63. The system of claim 56,
wherein the directory map file is a first directory map file;
wherein the program instructions are further executable to:
provide a second directory map file, wherein the second directory map file comprises a listing of at least one directory in the current set of data objects and a listing of at least one file in the at least one directory;

provide a first directory map update for the at least one modification data block, wherein the first directory map update comprises a new filename or a deleted filename; and update the first directory map file with the first directory map update, wherein at least part of the updating the first directory map file is performed substantially simultaneously with the second directory map file being used to reference the maintained set of data blocks.

64. The system of claim 63, wherein the program instructions are further executable to:

use the first directory map file to reference the maintained set of data blocks after the updating the first directory map file.

* * * * *